United States Patent
Ferrere

(10) Patent No.: US 12,299,412 B2
(45) Date of Patent: May 13, 2025

(54) MULTIPLE-INPUT FLOATING-POINT PROCESSING WITH MANTISSA BIT EXTENSION

(71) Applicant: Imagination Technologies Limited, Kings Langley (GB)

(72) Inventor: Thomas Ferrere, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 166 days.

(21) Appl. No.: 17/404,868

(22) Filed: Aug. 17, 2021

(65) Prior Publication Data
US 2022/0050665 A1 Feb. 17, 2022

(30) Foreign Application Priority Data
Aug. 17, 2020 (GB) ...................................... 2012832

(51) Int. Cl.
*G06F 7/485* (2006.01)
*G06F 5/01* (2006.01)
*G06F 7/499* (2006.01)

(52) U.S. Cl.
CPC .............. *G06F 7/485* (2013.01); *G06F 5/012* (2013.01); *G06F 7/49915* (2013.01); *G06F 7/49936* (2013.01)

(58) Field of Classification Search
CPC ........... G06F 7/49915; G06F 7/48–575; G06F 5/01–012; G06F 5/00–012; H03M 7/24
See application file for complete search history.

(56) References Cited

U.S. PATENT DOCUMENTS 5,359,548 A 10/1994 Yoshizawa et al.
6,801,924 B1 * 10/2004 Green ................. G06F 9/30025
708/204

(Continued)

FOREIGN PATENT DOCUMENTS

EP 2846257 A1 3/2015

OTHER PUBLICATIONS

D. Goldberg, 'What Every Computer Scientist Should Know about Floating-Point Arithmetic', ACM Comput. Surv., vol. 23, No. 1, pp. 5-48, Mar. 1991. (Year: 1991).*

(Continued)

*Primary Examiner* — Andrew Caldwell
*Assistant Examiner* — Huy Duong
(74) *Attorney, Agent, or Firm* — Potomac Law Group, PLLC; Vincent M DeLuca

(57) ABSTRACT

A method and system for processing a set of 'k' floating point numbers to perform addition and/or subtraction is disclosed. Each floating-point number comprises a mantissa ($m_i$) and an exponent ($e_i$). The method comprises receiving the set of 'k' floating point numbers in a first format, each floating-point number in the first format comprising a mantissa ($m_i$) with a bit-length of 'b' bits. The method further comprises creating a set of 'k' numbers ($y_i$) based on the mantissas of the 'k' floating-point numbers, the numbers having a bit-length of 'n' bits obtained by adding both extra most-significant bits and extra least-significant bits to the bit length 'b' of the mantissa ($m_i$). The method includes identifying a maximum exponent ($e_{max}$) among the exponents $e_i$, aligning the magnitude bits of the numbers ($y_i$) based on the maximum exponent ($e_{max}$) and processing the set of 'k' numbers concurrently.

19 Claims, 8 Drawing Sheets

(56) References Cited

U.S. PATENT DOCUMENTS

| | | | |
|---|---|---|---|
| 8,412,756 | B1 | 4/2013 | Langhammer |
| 8,977,669 | B2 | 3/2015 | Chen et al. |
| 9,495,131 | B2 | 11/2016 | Chen et al. |
| 10,514,891 | B1 | 12/2019 | Yang et al. |
| 10,534,578 | B1* | 1/2020 | Narayanaswami ..... G06F 7/485 |
| 2015/0067010 | A1* | 3/2015 | Czajkowski ............ G06F 7/485 |
| | | | 708/209 |
| 2016/0291934 | A1 | 10/2016 | Czajkowski |
| 2018/0278264 | A1* | 9/2018 | Rovers .................... G06F 7/483 |
| 2020/0371748 | A1* | 11/2020 | Yang ................... G06F 9/30014 |

OTHER PUBLICATIONS

D. Connors, Y. Yamada, W. Hwu, "A Software-Oriented Floating-Point Format for Enhancing Automotive Control Systems," Workshop on Compiler and Architecture Support for Embedded Computing Systems (CASES98), 1998. (Year: 1998).*

Louca, Cook and Johnson, "Implementation of IEEE single precision floating point addition and multiplication on FPGAs," 1996 Proceedings IEEE Symposium on FPGAs for Custom Computing Machines, Napa Valley, CA, USA, 1996, pp. 107-116. (Year: 1996).*

M. Roth, "Addition and Subtraction," Fall 2000, University of Alaska CS 301 Course Notes. Wayback Machine snapshot from Sep. 2, 2006. (Year: 2006).*

Jian Liang, R. Tessier and O. Mencer, "Floating point unit generation and evaluation for FPGAs," 11th Annual IEEE Symposium on Field-Programmable Custom Computing Machines, 2003. FCCM 2003., Napa, CA, USA, 2003, pp. 185-194. (Year: 2003).*

Tao et al; "Three-Operand Floating-Point Adder"; 2012 IEEE 12th International Conference on Computer and Information Technology; Oct. 27, 2012; pp. 192-196.

Sohn et al., "A Fused Floating-Point Three-Term Adder," IEEE Transactions on Circuits and Systems, I: Regular Papers, vol. 61, No. 10, Oct. 2014.

Tenca, "Multi-operand Floating Point Addition," 2009 19th IEEE International Symposium on Computer Arithmetic, IEEE Computer Society 2009.

* cited by examiner

MULTIPLE-INPUT FLOATING-POINT PROCESSING WITH MANTISSA BIT EXTENSION

BACKGROUND

Most computing systems use number formats, typically in binary notation or base 2, for performing various computations. These number formats include fixed-point or floating-point number formats. Fixed point number formats can provide additional precision but is used to represent only a limited range of values. Therefore, floating point number formats are used in most of the modern computing systems to provide a trade-off between range and precision.

A floating-point number comprises a mantissa (m) having a bit length of 'b' bits, an exponent (e) having a bit length of 'a' bits and optionally a sign bit (s) to represent a binary number. In some widely used formats the exponent is biased (i.e. offset) by a value (c) so as to represent numbers smaller than 1 and is used to encode exceptional values at its end points. For non-extremal values of e, the floating-point number x is said to be normalized and the number x is represented as $(-1)^s 2^{e-c}(1+2^{-b}m)$. When e=0, the floating-point number x is said to be denormal and the number x represented as $(-1)^s 2^{1-c} 2^{-b} m$. This includes the value 0 which is obtained by letting m=0. Thus, floating point numbers can be used to represent very small or very large numbers precisely using scientific notation, in binary or in some other base. The use of floating-point numbers in arithmetic computations provides varying degrees of precision depending on the bit length or type of floating-point format used.

Computations involving sums of large arrays of real valued numbers occur commonly in the solution of various numerical problems. For example, such sums can occur as part of a dot product calculation. It is therefore advantageous to have hardware dedicated to performing summations in high performance computing systems, graphic processing systems, neural network accelerators and other data processing functions. Conventionally, there are different ways to achieve this, with different benefits and drawbacks.

A known method in computing systems, to do addition of a set of floating-point numbers is by accumulation. This form of sequential summation uses a floating point adder and adds each input number in turn into a floating point accumulator. An adder unit 100 using this principle is shown in FIG. 1. The adder unit 100 comprises a multiplexer 102, and an adder 104. An array of floating-point numbers $x_1$, $x_2$, ... $x_n$ are provided as input to the multiplexer 102. The multiplexer 102, in each cycle, provides a floating-point number as a first input to the adder 104. The adder 104 accumulates or adds each floating-point number to a second input. The output (sum) generated by the adder 104 is fed back to the adder as the second input. The output from the adder in each step is rounded which causes a rounding error in the output generated in each cycle. The rounding error is a characteristic feature of floating-point calculations.

Thus, each floating-point number is added to a previously calculated output (sum) to generate a new or cumulative output. In other words, the overall sum is performed as a sequence of individual sums of two numbers. A final output (y) generated after adding all the floating-point numbers in the array is provided as the output of the adder unit 100. Thus, performing the sequential summation will yield of throughput of 1/(n−1) in the case of n input numbers. Further, when very small numbers are added to very large values, large cancellation errors may occur by rounding.

Architectures that provide more throughput can be obtained by using multiple floating-point adders. For example, using n−1 floating point adders one can accumulate the sum of n floating point numbers in a pipelined manner, with a throughput of 1. Further, using a sequential chain of floating point adders will give a latency of (n−1) cycles as for accumulation.

Hence, existing methods and architectures for processing floating-point numbers have drawbacks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system for processing a set of 'k' floating point numbers to perform addition and/or subtraction is disclosed herein. Each floating-point number comprising a mantissa ($m_i$) and an exponent ($e_i$). The method comprises receiving the set of 'k' floating point numbers in a first format. The method further comprises creating a set of 'k' numbers ($y_i$) based on the mantissas of the 'k' floating-point numbers. The method includes identifying a maximum exponent ($e_{max}$) among the exponents $e_i$, aligning the magnitude bits of the numbers ($y_i$) based on the maximum exponent ($e_{max}$) and processing the set of 'k' numbers concurrently.

According to a first aspect there is provided a method of processing a set of 'k' floating point numbers to perform addition and/or subtraction, k≥3, using a hardware implementation, each floating-point number comprising a mantissa ($m_i$) and an exponent ($e_i$), wherein the method comprises: receiving the set of 'k' floating point numbers in a first format, each floating-point number in the first format comprising a mantissa ($m_i$) with a bit-length of 'b' bits; creating a set of 'k' numbers ($y_i$) based on the mantissas of the 'k' floating-point numbers, the numbers having a bit-length of 'n' bits obtained by adding both extra most-significant bits and extra least-significant bits to the bit length 'b' of the mantissa ($m_i$), wherein the 'n' bits comprises a number of magnitude bits, wherein 'n' is b+⌈$\log_2$(k)⌉+⌈$\log_2$(k−1)⌉+x bits, where x is an integer, and x≥1; identifying a maximum exponent ($e_{max}$) among the exponents $e_i$; aligning the magnitude bits of the numbers ($y_i$) based on the maximum exponent ($e_{max}$); and processing the set of 'k' numbers concurrently.

Optionally, the set of 'k' floating point numbers comprises unsigned floating point numbers that explicitly include a leading bit.

Optionally, the set of 'k' floating point numbers comprises unsigned floating point numbers that implicitly includes a leading bit and x≥2.

Optionally, the set of 'k' floating point numbers comprises signed floating point numbers that explicitly include a leading bit and x≥2.

Optionally, the set of 'k' floating point numbers comprises signed floating point numbers that implicitly includes a leading bit and x≥3.

Optionally, x≤3 and optionally x≤b.

Optionally, adding the extra most-significant bits comprises adding at least ⌈$\log_2$(k)⌉ number of the most-significant bits.

Optionally, adding the extra least-significant bits comprises adding at least $\lceil \log_2(k-1) \rceil + 1$ number of the least-significant bits.

Optionally, adding the extra most-significant bits comprises adding a leading bit if the received set of 'k' floating point numbers in the first format implicitly include a leading bit.

Optionally, the method comprises forming the magnitude bits of the numbers ($y_i$) by prefixing the bits of the mantissa $m_i$ of the floating-point number with the leading bit.

Optionally, the method further comprises: calculating an output value by processing 'k' numbers ($y_i$); renormalizing the output value; and rounding the output value to represent the output value as a floating-point number.

Optionally, aligning the magnitude bits of the numbers ($y_i$) to be based on the maximum exponent ($e_{max}$) comprises the steps of, for each floating-point number (i): calculating the difference ($e_d$) between the maximum exponent ($e_{max}$) and exponent ($e_i$); and shifting the magnitude bits of the corresponding number ($y_i$), to the LSB side, based on the calculated difference ($e_d$).

Optionally, further to shifting the magnitude bits of the numbers, the method further comprises truncating the bits of the numbers that are shifted outside the bit-length of the number.

Optionally, the method further comprises determining a two's complement of the magnitude bits of the numbers, based on a sign bit ($s_i$) of each corresponding number, if the set of 'k' floating point numbers comprises signed floating point numbers.

Optionally, identifying the maximum exponent is performed by determining the largest value among the exponents $e_i$ in the set of 'k' floating point numbers.

Optionally, processing the 'k' numbers comprises calculating a sum value by performing an 'n' bit carry save addition.

Optionally, processing the set of 'k' floating point numbers generates the same output value irrespective of the order in which the set of 'k' floating point numbers are provided as inputs.

According to a second aspect, there is a provided a hardware implementation for processing a set of k floating point numbers to perform addition and/or subtraction, k≥3, each floating-point number comprising, a mantissa ($m_i$) and, an exponent ($e_i$), the hardware implementation comprising a format conversion unit, a maximum exponent detection unit, an alignment unit and a processing unit. The format conversion unit configured to: receive the set of 'k' floating point numbers in a first format, each floating-point number in the first format comprises the mantissa ($m_i$) with a bit-length of 'b' bits; and convert the mantissa ($m_i$) of the set of 'k' floating point numbers to a set of 'k' numbers ($y_i$), the numbers ($y_i$) having a bit-length of 'n' bits created by adding both extra most-significant bits and extra least-significant bits to the bit length 'b' of the mantissa ($m_i$), where in the 'n' bits comprises a magnitude bits and wherein 'n' is $b + \lceil \log_2(k) \rceil + \lceil \log_2(k-1) \rceil + x$ bits, where x is an integer, and x≥1. The maximum exponent detection unit configured to identify a maximum exponent ($e_{max}$) among the exponents $e_i$. The alignment unit configured to align the magnitude bits of the numbers based on the maximum exponent ($e_{max}$). The processing unit configured to process the set of 'k' numbers concurrently to generate an output value.

Optionally, the format conversion unit receives the set of 'k' floating point numbers in a first format comprising unsigned floating point numbers which explicitly includes a leading bit.

Optionally, the format conversion receives the set of 'k' floating point numbers in a first format comprising unsigned floating point numbers which implicitly includes a leading bit and x≥2.

Optionally, the format conversion unit receives the set of 'k' floating point numbers in a first format comprising signed floating point numbers which explicitly includes a leading bit and x≥2.

Optionally, the format conversion receives the set of 'k' floating point numbers in a first format comprising signed floating point numbers which implicitly includes a leading bit and x≥3.

Optionally, further comprises a renormalizing unit configured to: renormalize the output value; and round the output value to represent the output value as a floating-point number.

Optionally, the format conversion unit converts the mantissa ($m_i$) by adding a leading bit, if the received set of 'k' floating point numbers in the first format implicitly include a leading bit.

Optionally, the format conversion unit prefixes each mantissa ($m_i$) with the added leading bit while creating the numbers.

Optionally, the alignment unit aligns the magnitude bits of the numbers to be based on the maximum exponent ($e_{max}$), wherein the alignment unit comprises: a plurality of subtraction units, wherein each subtraction unit is configured to calculate the difference ($e_d$) between the maximum exponent ($e_{max}$) and exponent ($e_i$) for each floating-point number (i); and a plurality of shifter units, each shifter unit configured to shift the magnitude bits of the corresponding number, to the LSB side, based on the calculated difference ($e_d$).

Optionally, the alignment unit further truncates the bits of the numbers that are shifted outside of the bit length of the numbers.

Optionally, the alignment unit further comprises a plurality of complementing units configured to determine two's complement of the magnitude bits of each number, based on a sign bit ($s_i$) of the corresponding number, if the set of 'k' floating point numbers comprises signed floating point numbers.

Optionally, the format conversion unit converts the mantissa ($m_i$) of the set of 'k' floating point numbers to the set of 'k' numbers by adding at least $\lceil \log_2(k) \rceil$ number of extra most-significant bits to the mantissa (mi).

Optionally, the format conversion unit converts the mantissa ($m_i$) of the set of 'k' floating point numbers to the set of 'k' numbers by adding at least $\lceil \log_2(k-1) \rceil + 1$ number of extra least-significant bits to the mantissa ($m_i$).

Optionally, the plurality of shifter units perform the shifting of magnitude bits in parallel, reducing the delay to a considerable extent.

Optionally, the plurality of shifter units and the plurality of the complementing unit are implemented one after the other in any order.

Optionally, processing unit is a carry save adder circuit capable of adding 'k' the numbers to generate a sum value as the output value.

According to a third aspect, there is a provided computer readable code configured to cause the method of the first aspect to be performed when the code is run.

According to a fourth aspect, there is a provided a computer readable storage medium having encoded thereon the computer readable code of the third aspect.

The hardware implementation of an adder according to the first aspect discussed above may be embodied in hardware on an integrated circuit. There may be provided a method of manufacturing, at an integrated circuit manufacturing system, an adder. There may be provided an integrated circuit definition dataset that, when processed in an integrated circuit manufacturing system, configures the system to manufacture an adder. There may be provided a non-transitory computer readable storage medium having stored thereon a computer readable description of an adder that, when processed in an integrated circuit manufacturing system, causes the integrated circuit manufacturing system to manufacture an integrated circuit embodying an adder.

There may be provided an integrated circuit manufacturing system comprising: a non-transitory computer readable storage medium having stored thereon a computer readable description of the a hardware implementation of an adder according to the first aspect discussed above; a layout processing system configured to process the computer readable description so as to generate a circuit layout description of an integrated circuit embodying the adder; and an integrated circuit generation system configured to manufacture the adder according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
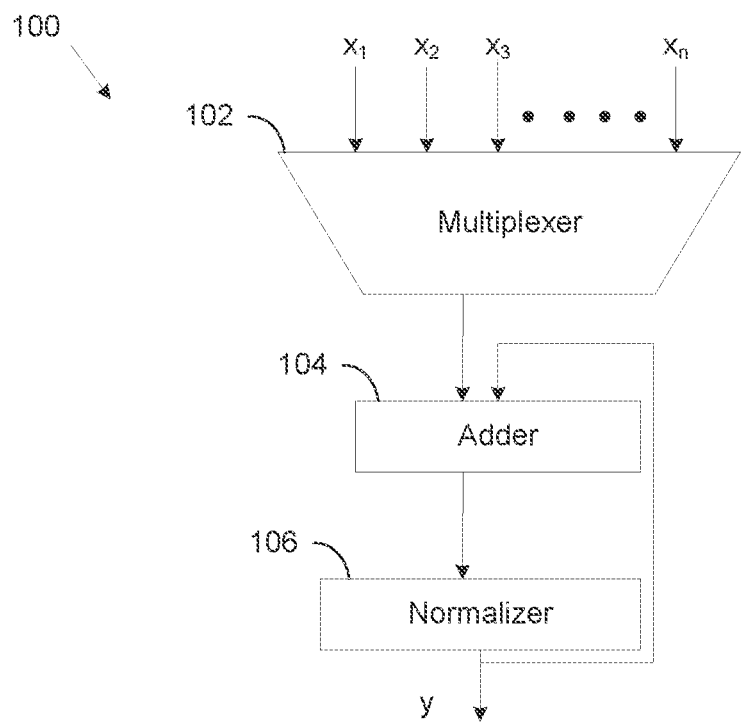
FIG. 1 is a block diagram illustrating a conventional floating point accumulator.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented byway of example to enable a person skilled in the art to make and use the invention. The present invention is not limited to the embodiments described herein and various modifications to the disclosed embodiments will be apparent to those skilled in the art.

Embodiments will now be described by way of example only.

When improving the computation performance of processing floating-point numbers, such as performing addition or subtraction, the accuracy of the output generated, and the computational speed are the two primary criteria considered.

Figure 2:
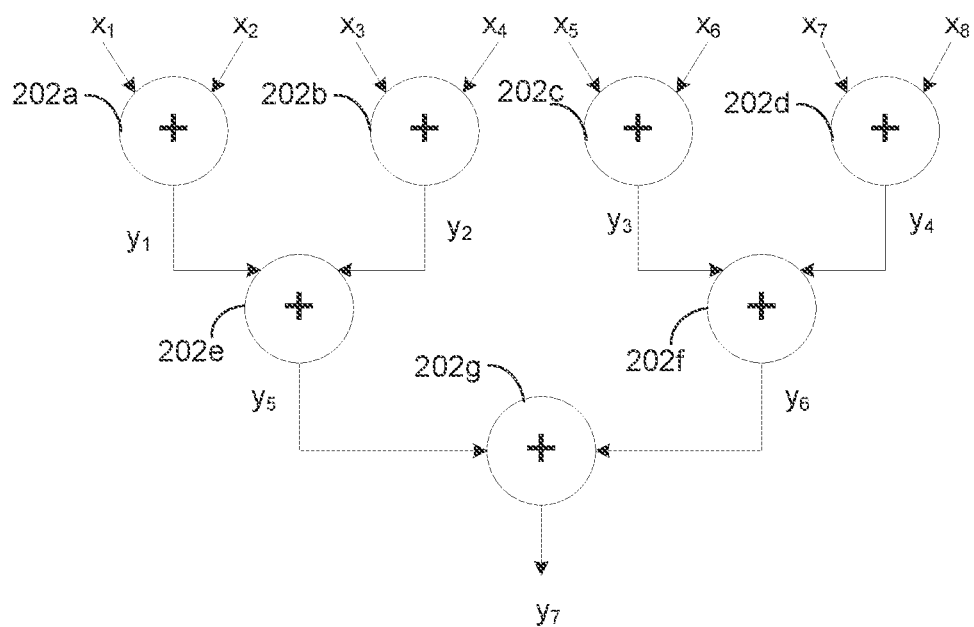
FIG. 2 is a schematic block diagram illustrating a network of floating point adders aimed at minimising latency.

Some arrangements of floating point adders providing faster computation include arrangements for performing parallel summation. These can be also be used to reduce the latency of the network. For example, a particular implementation of a network of floating point adders for performing parallel summation and aimed at reducing latency is shown in FIG. 2. The tree adder 200 in FIG. 2 comprises a plurality of adders 202a, 202b ... 202g, arranged in a balanced structure. Each adder is configured to receive two inputs and generate an output (sum) of the two inputs. Using the tree adder 200, addition of 'n' floating-point numbers can be realized using $\lceil \log_2(n) \rceil$ stages.

In the example given in FIG. 2, an array of 8 floating-point numbers $(x_1, x_2, \ldots x_8)$ is provided as input to the tree adder 200. In a first stage, two (different) inputs of the array are provided to each of four adders (primary adders) in the plurality of adders. Thus, 8 floating point numbers are provided as input to four primary adders (202a, 202b, 202c and 202d). Each adder generates a first output value y, thereby generating four first output values $(y_1, y_2, y_3$ and $y_4)$. During a second stage, two (different) values of the first output values are provided as input to each of two adders (secondary adders) among the plurality of adders. Thus, four first outputs are provided as inputs to two secondary adders (202e and 202f). Each secondary adder (202e and 202f) generates a secondary output, thereby generating two secondary output values $(y_5$ and $y_6)$. Further, in a third stage, the two secondary output values are provided as input to a tertiary adder 202g. The tertiary adder 202g generates a final output $y_7$ which is the sum of the array of 8 floating-point numbers. Thus, the addition of 8 floating point numbers can be performed in $\lceil \log_2(8) \rceil$ stages (i.e. 3 stages).

Further, in generalized examples the tree adder need not be a balanced structure as shown in FIG. 2. The tree adder can instead add the floating-point numbers using a single adder at every different stage. For example, any two floating point numbers are added in a first stage to generate a first sum value. Further, the first sum value is added to another floating-point number in a second stage using a second adder to generate a second sum value and so on. The latency of the arrangement increases in this example compared to a balanced tree adder.

However, in all these examples and the example provided in the background, in each stage the output values are rounded or truncated in order to fit the output value into its finite representation. Multiple rounding may result in dramatic cancellations. For different orders in which each input is provided to a tree adder, different outputs are generated.

A dramatic cancellation can occur when very small numbers are added to very large ones, and may cause significant bits of the result to be lost due to rounding. E.g., when summing a large positive number, P, the corresponding negative number, −P, and two small positive numbers Q and R, the precise value of the sum is (Q+R). An arrangement of floating point additions summing P and −P in a first primary adder and Q and R in a second primary adder ought to give the final result (Q+R). However, if the inputs are ordered differently and the primary adders perform the sums (P+Q) and (−P+R), and P is much larger than Q and R, then the outputs of the primary adders could be rounded to P and −P, giving an overall output of 0. Similar effects can be observed in an accumulator architecture.

As discussed above, the existing methods of processing floating point numbers, such as performing addition using accumulators or binary tree adders, generate output values of varying precision based on the order in which the numbers are provided as the input. That is, a certain order of providing the inputs generates the best result which is the closest approximation to the actual sum of the numbers. Other orders of providing the inputs may generate results which are not so close to the actual sum of the numbers. Thus, based on the order in which the inputs are provided, there could be a range of results obtained, around the actual sum of the floating-point numbers.

The varying precision of the results obtained is due to reasons such as truncation errors or rounding errors, and dramatic cancellation as discussed earlier. Also, the delay in performing addition using an accumulator for a large array of numbers is drastic, as the addition happens sequentially. Even though the method of performing addition using a binary tree adder enables parallel summation, the addition still needs to be performed in various stages to generate a final output value. Further, re-normalizing and rounding is performed in each stage, which increases the delay in generating the output value. Therefore, there is a need for a method of processing a set of floating-point numbers more precisely and with less delay.

Described herein is a hardware implementation and method of processing a set of k floating-point numbers concurrently. The method includes converting each floating-point number, received in a first format, to a number in a second format for processing. Further, the method includes processing the numbers in the second format concurrently (e.g. obtaining a sum by performing a single sum over all the numbers in the set, in contrast to performing multiple sums across the set) to generate an output value.

Figure 3:
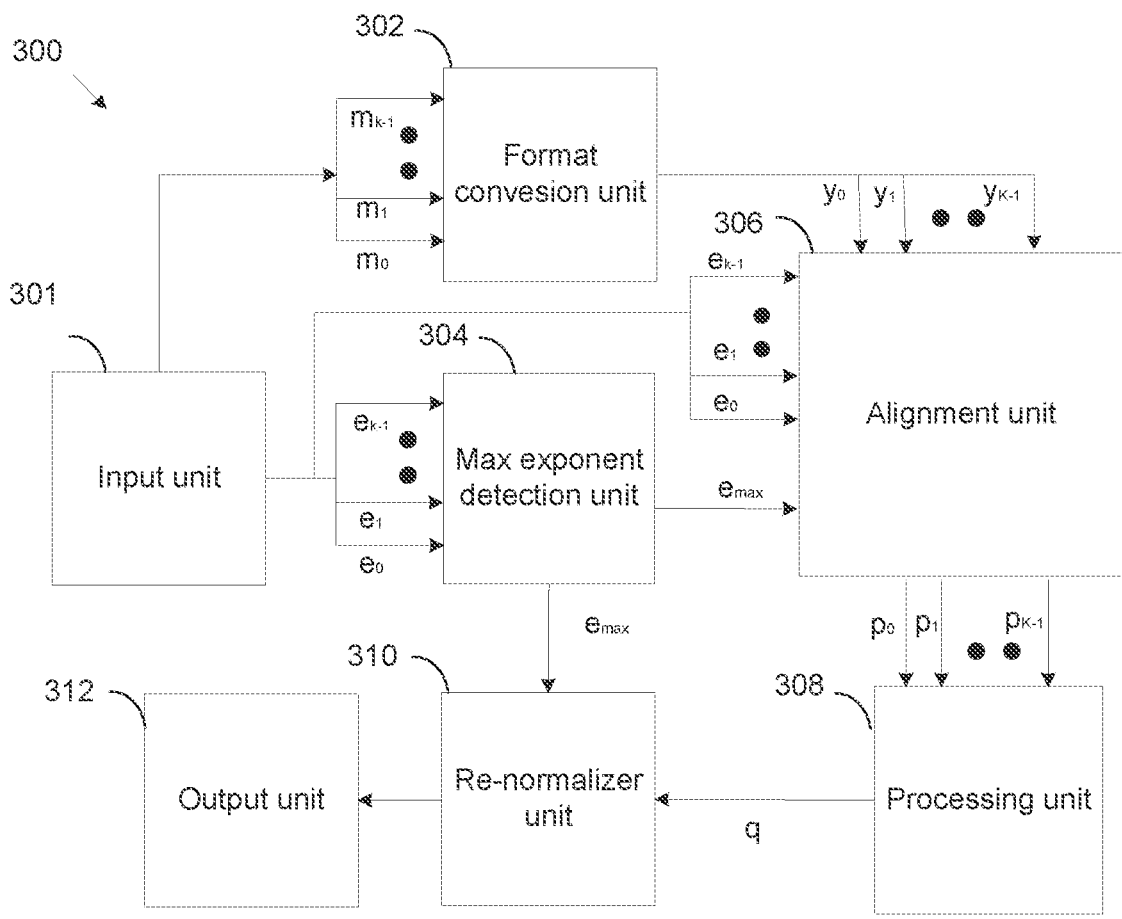
FIG. 3 is a block diagram illustrating an example of a hardware implementation of an adder.

FIG. 3 is a block diagram illustrating an example of an implementation of an architecture for processing a set of k floating-point numbers. The architecture 300 is an adder performing addition or subtraction of the set of k floating-point numbers ($x_0$, $x_1$, $x_2$ ... $x_{k-1}$) to generate an output value. The architecture is particularly suitable for adding large arrays of numbers, but can be used to add two, or more than two, numbers as required. The architecture 300 comprises a format conversion unit 302, a maximum exponent detection unit 304, an alignment unit 306, a processing unit 308, and a re-normalizing unit 310. Each number in the set of 'k' floating-point numbers comprises a mantissa $m_i$ with a bit length of 'b' bits and an exponent $e_i$ with a bit length of 'a' bits. The set of 'k' floating-point numbers may be signed numbers or unsigned numbers. In the case of signed numbers, the numbers would also each comprise a sign bit $s_i$ as well as the mantissa and exponent. However, some floating-point formats (e.g. unsigned formats) may not include a sign bit.

The set of 'k' floating-point numbers ($x_0$, $x_1$, $x_2$ ... $x_{k-1}$) can be received in an input unit 301. The input unit 301 can be a storage or a memory unit that can store the received inputs. The set of 'k' floating-point numbers ($x_0$, $x_1$, $x_2$ ... $x_{k-1}$) are stored in an incoming, first, format, and are hereinafter referred to as numbers in the first format. The format conversion unit 302 receives mantissas ($m_0$, $m_1$, $m_2$ ... $m_{k-1}$) of the set of 'k' floating-point numbers from the input unit 301. The format conversion unit 302 converts mantissas ($m_0$, $m_1$, $m_2$ ... $m_{k-1}$) to 'k' numbers in a different, second format ($y_0$, $y_1$, $y_2$ ... $y_{k-1}$), as described in more detail below.

The bit-length of the mantissa and exponent of the numbers in the first format is identified based on the type of the floating-point number format. The first format may be a predefined format that the architecture 300 is designed to receive, or may be identified on a task-by-task basis (e.g. by a controller, not shown). Examples of various types of the floating-point number formats include but are not limited to IEEE formats including half precision floating-point numbers (16 bit float), single precision floating-point numbers (float) and double precision floating-point numbers (double), or other formats such as a brain floating-point numbers (bfloat16). In some of the examples below, we consider IEEE single precision floating-point format as the first format having a mantissa $m_i$ with a bit length of 23 bits and an exponent $e_i$ with a bit length of 8 bits. In some other examples given below, we consider brain floating-point format as the first format having a mantissa $m_i$ with a bit length of 7 bits and an exponent $e_i$ with a bit length of 8 bits for the explanation of the method. However, it is understood that the invention is not limited to these formats and a person skilled in the art would understand that the architecture 300 could be implemented to use numbers in any type of the floating-point number format to perform the method described herein.

The format conversion unit 302 converts the floating-point numbers in the first format to numbers in the second format. This comprises converting the mantissa '$m_i$' of each floating-point number in the set of 'k' floating-point numbers to a number '$y_i$'. On receiving the set of 'k' floating-point numbers with all the numbers as unsigned floating point numbers, the format conversion unit converts the mantissa to create a set of k unsigned numbers. Similarly, on receiving the set of 'k' floating-point numbers as signed floating point numbers, the format conversion unit converts the mantissa to create a set of k signed numbers. The format conversion unit 302 converts the mantissa $m_i$ having a bit length of 'b' bits (in first format) to create the number '$y_i$' with a bit length of 'n' bits (to represent a second format). The bit length of 'n' bits is obtained by adding both one or more extra most-significant bits (MSBs) and one or more extra least-significant bits (LSB) to the mantissa ($m_i$) of bit length 'b' bits in the first format. Thus, the bit length 'n' is always greater than the bit length 'b' of the original mantissa.

If the set of 'k' floating-point numbers are unsigned floating point numbers, then the representation of unsigned numbers created, with a bit length of 'n' bits includes n magnitude bits. If the set of 'k' floating-point numbers are signed floating point numbers, then the extra MSBs added to the mantissa of the first format can comprise a bit representing a sign bit. Thus, the representation of signed numbers created, with a bit length of 'n' bits includes a sign bit and (n−1) magnitude bits. Often floating point formats will not explicitly encode the leading bit (i.e. a bit representing a digit occurring before the radix point) as it can be assumed to be 1 in binary floating point numbers, and thus can be implicitly coded (and so is also referred to as a 'hidden bit'). Thus, where the leading bit is a 'hidden bit' in the first format, the second format adds a bit to account for the leading bit to the bit-length of the number '$y_i$' in the second format. The format conversion unit forms this particular magnitude bit of the number '$y_i$' by prefixing the bits of the mantissa of the floating-point number with a leading bit having a value based on the value of the floating point number encoded (i.e. whether it is a normal or denormal number). In this second format, as output by the format conversion unit, each number could be considered to effectively be a combination of a sign bit (if added) with a floating point mantissa of extended bit width, with the radix point occurring at the same position with respect to the bits representing the magnitude of the mantissa in the first format—the second format just includes extra bits both before and after where the radix point would occur.

The numbers in the first format are converted to numbers in the second format based on the number of floating-point numbers (k) in the set. That is, the number of extra MSBs and LSBs added to the mantissa ($m_i$) of the first format is determined based on the number 'k'. The mantissa $m_i$ is extended to the MSB side by at least a logarithmic amount of the number 'k' ($\lceil \log_2(k) \rceil$ bits and to the LSB side by at least a logarithmic amount of the number 'k−1' ($\lceil \log_2(k-1) \rceil$) bits to obtain the number '$y_i$'. Preferably, assuming the first format is a signed floating point number that has an implicit leading bit and treats any sign bit as separate from the mantissa, $\lceil \log_2(k) \rceil + 2$ extra MSBs and $\lceil \log_2(k-1) \rceil + 1$ LSBs are added on either side of the bit length 'b' of mantissa $m_i$. That is, two additional bits (other than the $\lceil \log_2(k) \rceil$ bits) in the extra MSBs added are assigned for the implicit leading bit (or hidden bit) and the sign bit $s_i$. The additional bit (other than the $\lceil \log_2(k-1) \rceil$ bits) in the extra LSBs added is a precision bit, for obtaining extra precision. The extra MSBs and LSBs added prevents overflow or underflow of bits, while processing the set of 'k' numbers which is explained in detail later. The numbers of extra MSBs and LSBs added to each side could be same or different in different examples. In general, the bit length 'n' of the number '$y_i$' in the second format can be obtained as $$n = b + \lceil \log_2(k) \rceil + \lceil \log_2(k-1) \rceil + x \text{ bits}$$

Where x is an integer and preferably x≥1, where the value of x depends on the number of extra bits added to represent leading bit, sign bit and precision bits, if any.

Figure 4A:
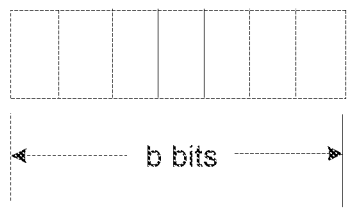
FIG. 4a is a block diagram illustrating a mantissa for a floating-point number in a first format representation.
Figure 4B:
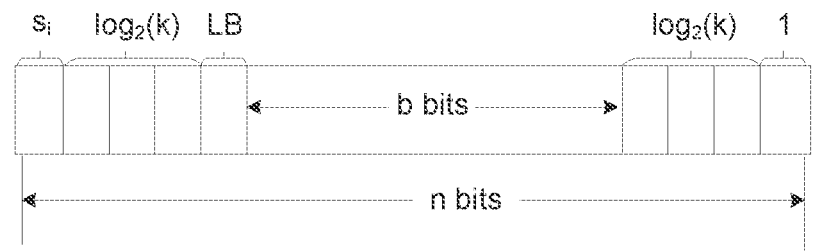
FIG. 4b is a block diagram illustrating a second format representation of a signed number.

FIG. 4a illustrates the representation of mantissa ($m_i$) in a first format and FIG. 4b illustrates the representation of signed number '$y_i$' in a second format. In FIG. 4a, the first format is shown as a brain floating point number with a mantissa bit length, b, of 7 bits. FIG. 4b shows the signed number represented in a second format. The representation in the FIG. 4b illustrates signed number '$y_i$' with a bit length of $n = b + \lceil \log_2(k) \rceil + \lceil \log_2(k-1) \rceil + 3$ bits. This is obtained by adding $\log_2(k) + 2$ extra MSBs and $\log_2(k-1) + 1$ extra LSBs to the bit-length 'b' of the mantissa. Thus, in an example when a set of 8 floating point numbers, of bit length 7 as shown in FIG. 4a, are added, i.e. k=8, then the signed number in the second format will have a bit length of n=16 bits.

It is clear from the example in FIG. 4b, that the number '$y_i$' represented in a second format, as defined herein, comprises a bit assigned for representing a sign bit ($s_i$), a bit assigned for representing a leading bit (LB) (i.e. hidden bit, not explicitly coded in the first format for the sake of efficiency) and a further $\lceil \log_2(k) \rceil$ bits as extra MSBs, and $\lceil \log_2(k-1) \rceil + 1$ extra LSBs. As such, the number '$y_i$' of the second format is a signed number and comprises both a sign bit and magnitude bits (i.e. the bits indicating the absolute magnitude of the represented value). The sign bit is assigned as a '0' or '1' bit based on whether the number is a positive or negative number. As explained above, if all the floating-point numbers in the set of 'k' floating-point numbers in the example were unsigned numbers, then the second format could be represented by adding $\lceil \log_2(k) \rceil + 1$ extra MSBs comprises a bit representing a leading bit and $\lceil \log_2(k) \rceil$ bits. Further, if all the floating-point numbers in the set of 'k' floating-point numbers represented in the first format in the example were unsigned numbers and contained an explicit leading bit, then the signed number '$y_i$' could be represented by adding $\lceil \log_2(k) \rceil$ extra MSBs to the bit-length b of mantissa $m_i$.

In the example shown in FIG. 4b, the number '$y_i$' comprises $\lceil \log_2(k) \rceil + 1$ extra LSBs added to the mantissa $m_i$. The number '$y_i$' could comprise $\lceil \log_2(k) \rceil + r$ extra LSBs added to the mantissa ($m_i$), where r is any integer, r≥1. Preferably, the number '$y_i$' comprises $\lceil \log_2(k) \rceil + 1$ extra LSBs added to the mantissa ($m_i$). The extra LSBs added to the mantissa $m_i$ increases the precision of the result obtained and reduce underflow of mantissa bits while aligning the number '$y_i$' which is explained in detail below.

Thus, in the example described in the above paragraphs where the first format is a signed floating point number that has an implicit leading bit, the number of additional bits x≥3. Further, in another example assuming the first format is a signed floating point number that has an explicit leading bit, $\lceil \log_2(k) \rceil + 1$ extra MSBs and $\lceil \log_2(k-1) \rceil + 1$ LSBs are added on either side of the bit length 'b' of mantissa $m_i$ to create the number '$y_i$', thus making the number of additional bits x≥2.

Similarly, in another example case, assuming the first format is an unsigned floating point number that has an implicit leading bit, $\lceil \log_2(k) \rceil + 1$ extra MSBs and $\lceil \log_2(k-1) \rceil + 1$ extra LSBs are added on either side of the bit length 'b' of mantissa $m_i$ to create the number '$y_i$', thus making the number of the additional bits x≥2. Further, in another example case, assuming the first format is an unsigned floating point number having an explicit leading bit, $\lceil \log_2(k) \rceil$ extra MSBs and $\lceil \log_2(k-1) \rceil + 1$ extra LSBs are added on either side of the bit length 'b' of mantissa $m_i$ to create the number '$y_i$', thus making the number of additional bits x≥1.

Thus, although it might be expected that more than b additional bits would be required to preserve the desired precision, in fact (as confirmed by the mathematical proof presented later) it is possible to achieve the desired precision with less than or equal to b additional bits, and in the examples above the desired precision can be achieved with the number of additional bits x less than or equal to three bits.

Thus, in a generalized example, x≥1 and x≤'b' bits, making the maximum bit length of number '$y_i$', $$n = 2b + \lceil \log_2(k) \rceil + \lceil \log_2(k-1) \rceil$$

The extra MSBs and LSBs added to the mantissa other than the sign bit and the leading bit are initially assigned '0' bits in the second format. The sign bit is assigned as a '0' or '1' bit based on whether the number is a positive or negative number. The leading bit is assigned as a '1' bit or '0' bit based on the type of the floating-point number format. In an example, a '1' bit is added as the leading bit when the floating-point number is a normalised non-zero number and a '0' bit is added as the leading bit when the floating-point number is a zero or denormalised number.

Further, the exponent '$e_i$' ($e_0$, $e_1$, $e_2$, $e_3$ ... $e_{k-1}$) of each number in the first format is provided as an input to the maximum exponent detection unit 304. The input '$e_i$' to the maximum exponent detection unit is provided from the input unit 301 as shown in FIG. 3. In some other arrangements, the exponents may be passed through the format conversion unit to the maximum exponent detection unit 304.

The maximum exponent detection unit 304 identifies the maximum exponent ($e_{max}$) from the exponents of the set of k numbers. The maximum exponent detection unit 304 detects the maximum exponents using various methods or functions. An example of a method of identifying the maximum exponent is using a binary tree structure. A method of identifying the maximum exponent ($e_{max}$) is described in detail, below, with reference to FIG. 5. However, which option is preferable may depend on the available resources (e.g. parallel processing may be faster overall, but more computationally intensive).

In addition to being provided to the maximum exponent detection unit 304, the exponent values $e_i$ are provided, from the input unit 301, as input to the alignment unit 306. The alignment unit 306 receives the exponent '$e_i$' of each floating point number in the first format as a first input. The alignment unit 306 further receives the maximum exponent ($e_{max}$) from the maximum exponent detection unit 304 as a second input and the number '$y_i$' from the format conversion unit 302 as the third input. The alignment unit 306 aligns the magnitude bits of each number '$y_i$', thereby converting the number '$y_i$' to a different number (or integer $p_i$) with a bit-length of n bits based on the maximum exponent. The method of aligning the number '$y_i$' is explained in detail with reference to FIG. 5, but in summary the numbers in the second format are adjusted to be based on the maximum exponent, and the adjusted numbers ($p_0$, $p_1$, $p_2$ ... $p_{k-1}$) are treated for convenience as integers for the subsequent processing in the processing unit 308.

Thereafter, the k integers ($p_0$, $p_1$, $p_2$ ... $p_{k-1}$) thus generated are provided to the processing unit 308. The processing unit 308 is an adder unit. The processing unit 308 processes the k integers (i.e. the k aligned numbers) concurrently. That is the processing unit performs a process on all the integers in the set at the same time rather than, for example, processing elements of the set sequentially. The processing unit 308 performs addition and/or subtraction of the k integers to generate an output value q. It is noted that addition of a negative number to a positive number is equivalent to performing a subtraction, and so the term processing is used herein to cover the acts of both addition and subtraction, alone or in combination.

The output value q from the processing unit 308 and the maximum exponent from the maximum exponent detection unit 304 is further provided into the re-normalizing unit 310. The renormalizing unit 310 converts the output value from the processing unit to a floating-point number, for example represented in the first format (but optionally represented in a different format, e.g. a third format, if desired), with a mantissa $m_i$ and exponent '$e_i$'. The output unit 312 stores the converted output value (i.e. the output floating point number).

Figure 5:
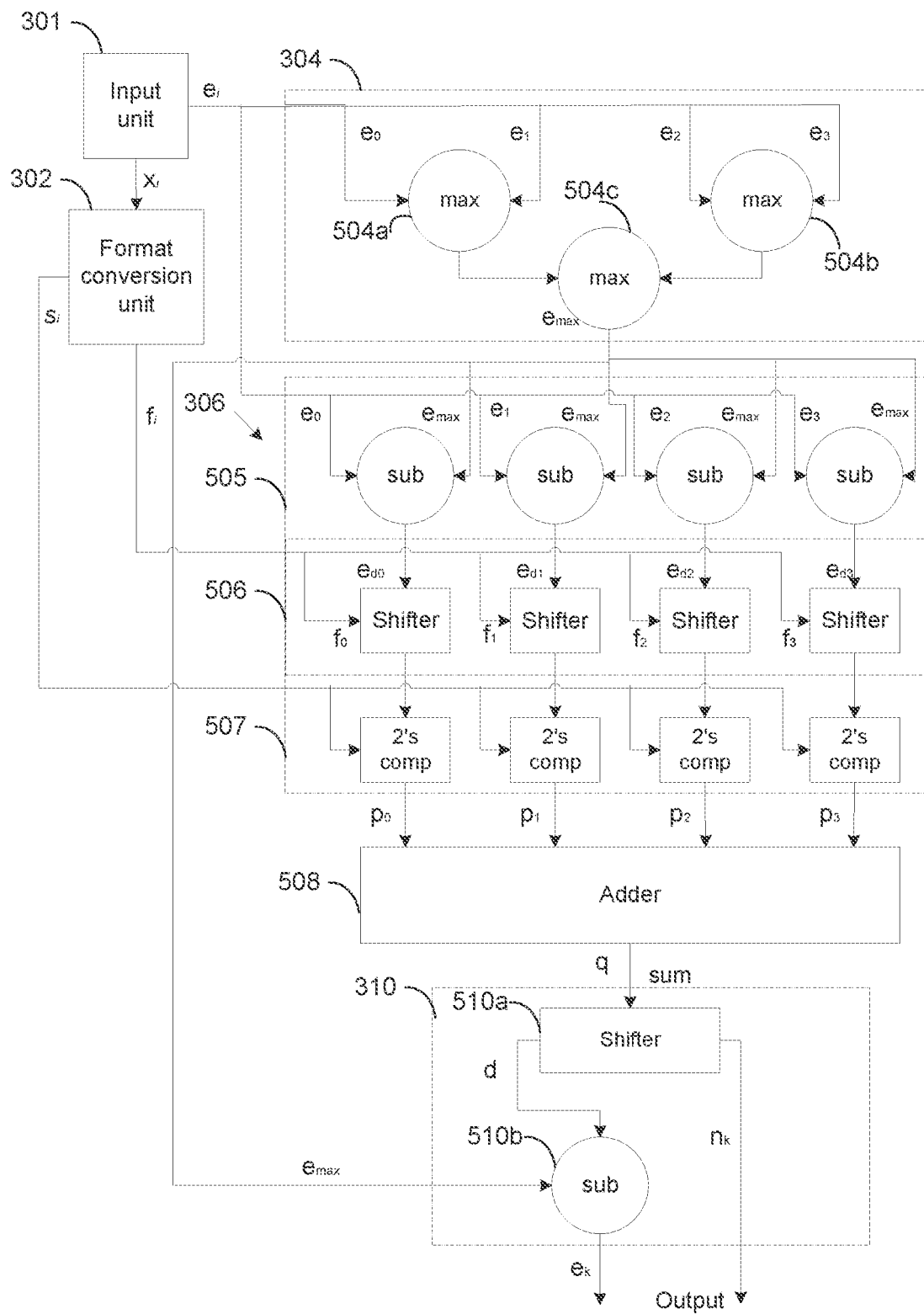
FIG. 5 is a block diagram illustrating the different units in the hardware implementation of the adder in FIG. 3.

FIG. 5 is a block diagram illustrating the different units in the implementation of the architecture 300 in FIG. 3. Consider a scenario where the set of k floating point numbers in the first format comprises four numbers, i.e. k=4. The format conversion unit 302 receives the set of four floating point numbers $x_i$ ($x_0$, $x_1$, $x_2$, $x_3$) as input. The format conversion unit 302 converts the set of 4 numbers in the first format to four numbers $y_i$ in the second format as described with reference to FIG. 3. In this example, consider the set of k floating point numbers in the first format are four signed floating point numbers with an implicit leading bit. Therefore, the set of k floating point numbers are converted to four signed numbers having a bit-length of n bits including a sign bit $s_i$, and (n−1) magnitude bits $f_i$. In other example cases, the set of k floating point numbers in the first format could be unsigned floating point numbers.

The exponent '$e_i$' of each number ($e_0$, $e_1$, $e_2$, and $e_3$) from the input unit 301 is provided to the maximum exponent detection unit 304.

The maximum exponent detection unit 304 in FIG. 5 comprises three maximum function logics 504a, 504b and 504c. This is by way of example only, and other implementations may have a different structure for finding the maximum exponent, or similar structures but with a different number of logics to account for a different number of inputs.

In the depicted example, the maximum function logic (max1) 504a receives the exponents $e_0$ and $e_1$. The maximum function logic (max2) 504b receives the exponents $e_2$ and $e_3$. The maximum function logic 504a identifies the maximum exponent value among $e_0$ and $e_1$. The maximum function logic 504b identifies the maximum exponent value among $e_2$ and $e_3$. Further, the output of the maximum function logic 504a and the maximum function logic 504b are provided to the maximum function logic (max3) 504c. The maximum function logic 504c identifies the maximum exponent value among the output of the maximum function logic 504a and the maximum function logic 504b to detect the $e_{max}$, i.e. the maximum exponent among the input exponents $e_0$, $e_1$, $e_2$, and $e_3$.

As mentioned above, the maximum detection unit 304 can be implemented in different other ways. For example, maximum detection unit 304 can be implemented using a binary search tree.

Returning to the depicted example, the maximum exponent identified by the maximum detection unit 304 is provided as input to the alignment unit 306. Further, the exponents of the four numbers in the first format are provided as input to the alignment unit 306. Further the four signed numbers '$y_i$' in the second format are provided as input to the alignment unit 306. The alignment unit 306 aligns the magnitude bits $f_i$ of each signed number '$y_i$', based on the maximum exponent and the respective exponent of the number in the first format corresponding to the signed number. In other words, the magnitude bits of the signed numbers for which the corresponding floating point number did not already have the maximum exponent are shifted to account for the difference in exponent of the number in the first format compared to the maximum exponent (effectively adding zeros before the first (or, at least, the first non-zero) magnitude bit, and removing trailing bits as required, to re-align the magnitude bits as appropriate). The alignment unit 306 thus converts each signed number ('$y_i$') to another integer ($p_i$) that is output by the alignment unit 306. The integer $p_i$ is considered as a fixed point number format. Similarly, in case of unsigned numbers the alignment unit shifts the magnitude bits of the unsigned numbers based on the maximum exponent and the respective exponent of the number in the first format corresponding to the unsigned number.

The conversion of the signed number '$y_i$' to an integer $p_i$ is illustrated with examples shown in FIG. 6a-6d. It will be appreciated, in describing this series of figures, that the starting point is the signed number '$y_i$' in a second format number, as output by the format conversion unit 302, and the end point is the converted signed number pi (integer $p_i$)

mentioned above. However, for ease of reference, the intermediary stages may also be referred to as signed numbers in the description below.

Consider an example of a floating-point number in a first format with an implicit leading bit and a sign bit separate to the mantissa. Each number has a mantissa $m_i$ having a bit length of 7-bits in the first format (such as bfloat 16). Thus, in this example, each number in a set of 4 numbers, when converted to the second format comprises a signed number $y_i$ having a bit length 'n' (including a sign bit $s_i$), where $$n = b + \lceil \log_2(k) \rceil + \lceil \log_2(k-1) \rceil + 3 =$$
$$7 + \lceil \log_2(4) \rceil + \lceil \log_2(4-1) \rceil + 3 = 7 + 2 + 2 + 3 = 14 \text{ bits}$$

Figure 6A:
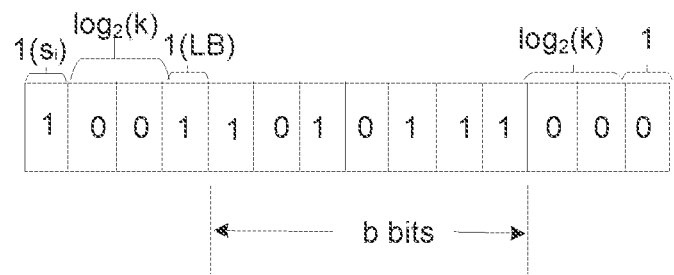
FIG. 6a to FIG. 6d illustrate an example of a floating-point number converted from a first format representation to a second format representation.

FIG. 6a illustrates the signed number '$y_i$' in the second format with a bit length of 14 bits. In an example, consider that the number shown FIG. 6a represents a signed number $y_0$ provided as input to the alignment unit 306. The alignment unit 306 comprises a plurality of subtraction modules 505. The alignment unit 306 further comprises a plurality of shifter units 506 and a plurality of complementing units 507.

Each of the subtraction modules receives an exponent $e_i$ as a first input from the input unit 301, the maximum exponent as a second input from the maximum exponent detection unit 304 and a signed number '$y_i$' from the format conversion unit 302 as a third input. The input unit 301 provides the original exponent '$e_i$' of the four numbers to each subtraction module. Each subtraction module calculates a difference '$e_{di}$' between the maximum exponent '$e_{max}$' and the exponent '$e_i$' of a number. In FIG. 5, a first subtraction module receives an exponent $e_0$ of a first number from the input unit 301 and the maximum exponent $e_{max}$ from the maximum exponent detection unit 304. The first subtraction module calculates a first difference referred to as $e_{d0}$ in FIG. 5. Similarly, the remaining subtracting modules calculate the differences $e_{d1}$, $e_{d2}$, and $e_{d3}$, as shown in FIG. 5. As shown, the plurality of subtraction modules calculate the differences $e_{di}$ for each number in parallel, but other arrangements are possible—e.g. a single subtraction module performing each subtraction in series. Returning to the example as depicted, each calculated difference $e_{d0}$, $e_{d1}$, $e_{d2}$, and $e_{d3}$ from the plurality of subtraction modules 505 is further provided to a corresponding shifter unit among the plurality of the shifter units 506.

Each shifter unit among the plurality of shifter units 506 receives the calculated difference $e_d$ of a number as a first input and the magnitude bits $f_i$ of the corresponding signed number '$y_i$' as the second input. Further, each shifter unit among the plurality of shifter units 506 shifts the magnitude bits $f_i$, of the signed number '$y_i$' based on the corresponding calculated exponent difference. The magnitude bits $f_i$ (except the sign bit) are shifted to the least significant bit side (i.e. the right in the depicted format) by a number of positions equal to the calculated exponent difference. FIG. 6a illustrates that the magnitude bits $f_i$ of signed number '$y_0$' of the first input include the 'b bits' corresponding to the bits of the mantissa of the number in the first format, prefixed by an explicit leading bit '1'. The remaining extra bits of the signed number '$y_0$' are padded with '0' bits. The original 'b bits' as well as the explicit leading bit are shifted by the shifter unit. Further, in FIG. 6a, the sign bit of the signed number $y_0$ is assigned with a '1' bit indicating that the signed number $y_0$ is a negative number. The sign bit is not shifted by the shifter unit.

Figure 6B:
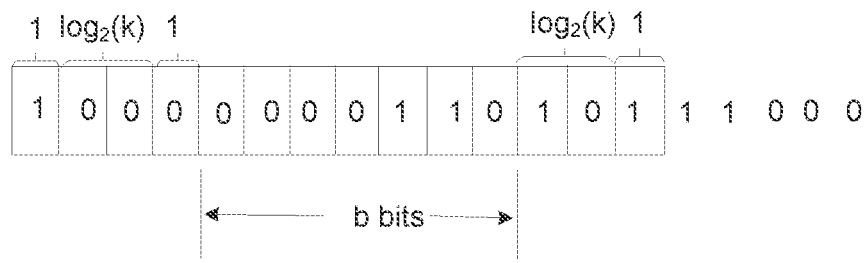

In the example, a first shifter among the plurality of shifters 506 receives the first input (magnitude bits $f_0$ of the signed number $y_0$), from the format conversion unit 302. Further, the first shifter receives the calculated difference $e_{d0}$ (in an example, for the first number having a mantissa ($f_0$) shown in FIG. 6a, consider that the calculated difference $e_{d0}$ (difference $e_{max}$ and $e_0$) is equal to 5) from the first subtraction module as the second input. Therefore, the first shifter unit shifts the magnitude bits $f_0$ of signed number $y_0$ by 5 positions to the right. FIG. 6b illustrates the shifted number. The calculated difference $e_d$ is never a negative number. Thus, the magnitude bits $f_i$ are always shifted to the least significant bit side (i.e. to the right in the example) based on the calculated difference $e_d$ for each number, possibly by zero positions.

Similarly, the other shifter units among the plurality of shifter units 506 shift the magnitude bits ($f_1$, $f_2$ and $f_3$) of the remaining three numbers based on the corresponding calculated differences $e_{d1}$, $e_{d2}$, and $e_{d3}$. Thus, all the shifter units in the plurality of shifter units 506 perform the shifting of magnitude bits $f_i$ in parallel whereas in most of the existing architectures for processing floating point numbers, the shifter shifts or aligns the mantissa in sequence as and when required which increases the delay to a considerable extent. Since, in the disclosed architecture, as the shifting or aligning of all the numbers occurs in parallel, the delay in processing could be significantly reduced as the number of floating-point numbers to be processed increases. In another implementation, it is possible that the plurality of shifter units 506 perform the shifting of magnitude bits $f_i$ in series despite the fact that delay is increased due to limitation on the available resources (e.g. parallel processing may be faster overall, but more computationally intensive).

Figure 6C:
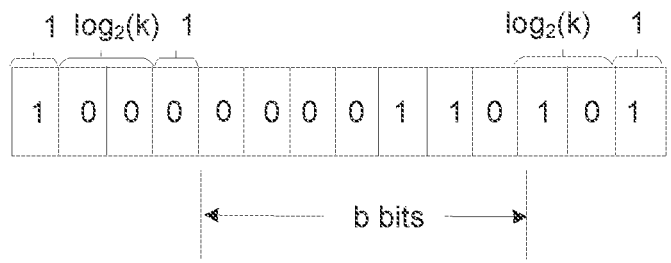

It can be seen in FIG. 6b that the shift of the magnitude bits results in 5 bits being shifted out of the bit-width of the signed number (and thus out of the stored representation of the number). The shifter units truncate the bits of the signed number that are shifted outside the bit length of n bits. The bits corresponding to the mantissa of the original number in the first format are shifted out of the bit length of 'n' bits when the calculated exponent difference for the corresponding number is greater than the number of extra LSBs added to the mantissa $m_i$ of the number in the first format when converting to the second format. When the calculated difference is greater than the number of extra LSBs, it causes underflow of bits from the original (first format) mantissa. When the calculated difference is less than the number of extra LSBs, it only causes underflow of 'zero' bits added by the format conversion unit 302. As mentioned above, FIG. 6b shows the 5 bits that are moved out of the bit length of n bits, when the bits were shifted by 5 bits. FIG. 6c illustrates the signed number after performing truncation. It is evident from the figure that though the bits are shifted by 5 bits, only 2 bits of the actual number (i.e. 2 bits of the mantissa of the number in the first format) is lost in this case, due to the extra LSBs that were added during conversion to the second format. Thus, the extra LSBs act to reduce the loss of precision that would occur if, for example, all numbers were shifted to use the same, maximum, exponent in the first format.

Figure 6D:
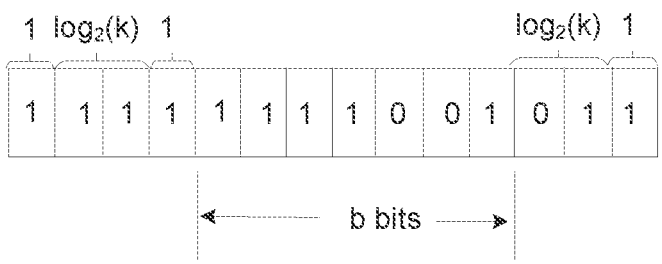

The output from the each of shifter unit 506 is further provided to a corresponding complementing unit among the plurality of complementing units 507. The complementing units receive the aligned magnitude bits from the shifter units as a first input and the sign bit of the signed number '$y_i$' as a second input. However, in other arrangements, the function of the complementing unit could be performed before the function of the shifting unit or as a part of adder unit (processing unit 308). In any case, the complementing unit performs the two's complement of the magnitude bits $f_i$ for those numbers having a sign bit indicating a negative number. In this case, the shifted positive signed numbers in the set are provided to the processing unit 308 (adder 508 in FIG. 5) without complementing. Further, the two's complements of the negative numbers in the set are provided to the processing unit. The processing unit 308 receives the output from the plurality of complementing units 507 and processes the aligned signed numbers $p_i$ concurrently to generate the output. The output obtained from each complementing unit is an aligned number $p_i$. FIG. 6d represents the number $p_0$ obtained by complementing the mantissa as shown in FIG. 6c.

Thus, the alignment unit 306 aligns the magnitude bits of the number '$y_i$' to generate a set of numbers (or integers) $p_i$ by performing the steps of shifting and truncating the magnitude bits $f_i$ of the number '$y_i$'. The alignment unit also converts to two's complement representation any numbers with a sign bit indicating the number is negative. In case of unsigned numbers '$y_i$', the alignment unit performing the steps of shifting and truncating the magnitude bits f of the number '$y_i$'. The only difference is that there is no need of performing the step of complementing in case of unsigned number. The alignment unit 306 is capable of processing each number in parallel for the steps of shifting, truncating and complementing the bits of the mantissa. The number $p_i$ obtained after conversion is an integer. The number pi is represented as $$p_i = 1 \cdot m_i \times 2^{e_{max} - e_i + \lceil log_2(k-1) \rceil + 1}$$

assuming the exponent bias is 0, in the interest of simplicity.

As shown in FIG. 5, the converted numbers i.e. the integers $p_0$, $p_1$, $p_2$ and $p_3$ are further provided to the adder 508 which is the processing unit 308. The signed integer $p_0$, thus generated by performing shifting, truncating, and complementing the magnitude bits $f_0$ of the signed number $y_0$ in the example is illustrated in FIG. 6d. In an example, the adder 508 is a carry save adder capable of adding 4 'n' bit integers. The value of the integer pi ranges between $-2^{b+\lceil log_2(k) \rceil + \lceil log_2(k-1) \rceil + 2}$ and $-2^{b+\lceil log_2(k) \rceil + \lceil log_2(k-1) \rceil + 2} - 1$. The carry save adder performs the addition of 4 signed integers $p_1$ to generate a sum value q (output).

$$q = \sum_{i=0}^{k-1} p_i$$

The magnitude of the summands (i.e. the 4 integers $p_i$) is less than $-2^{b+\lceil log_2(k) \rceil + \lceil log_2(k-1) \rceil + 2}$ and hence the sum value will be less than $-2^{b+\lceil log_2(k) \rceil + \lceil log_2(k-1) \rceil + 2}$ and does not overflow the 'n' bits. That is, the largest value integer $p_i$ will have a 1 in the position corresponding to the hidden bit—i.e. $\lceil log_2(k) \rceil + 2$ bits from the MSB end (accounting for the sign bit), and the sum of k numbers of that value (i.e. considering the extreme case where all the numbers have the maximum exponent) cannot overflow the additional $\lceil log_2(k) \rceil$ bits provided at the MSB end after the sign bit. The adder 508 processes the set of 'k' floating point numbers to generate the same output value irrespective of the order in which the set of 'k' floating point numbers are provided as inputs.

The sum value q is further provided to the re-normalizing unit 310. It will be noted that in this example the value q, like the values pi, will be a signed integer in two's complement format. The normalizing unit 310 comprises a shifter 510a and a subtractor 510b. The shifter 510a shifts the bits of the sum value q to generate a normalized value (in general format). The shifter 510a represents the sum value q in a normalized format by counting the number of the number of leading '0' bits or '1' bits (represented as 'd') occurring continuously in the MSB's (i.e. including the sign bit). The number of leading '0' bits are counted when the sum value obtained is a non-negative number and the number of leading '1' bits are counted when the sum value obtained is a negative number. The shifter shifts the bits of the number to generate a normalized number ($n_k$) in a normalized format. The number ($n_k$) is further rounded to represent the normalized number ($n_k$) with a desired bit-length—e.g. a bit length of 'b' bits if the output is to be in the same format as the input. The normalized number ($n_k$) is represented as (assuming $\lceil log_2(k) \rceil + 2$ MSBs were added when converting to the second format):

$$n_k = q \times 2^{\lceil log_2(k) \rceil + 1 - d}$$

The subtractor 510b receives the maximum exponent as the first input and d (the number of leading '0's or '1's) and the number of extra LSBs added to the mantissa of the first format) as the input. Further, the subtractor calculates the exponent of the normalized number based on the inputs and represent the exponent over a bitlength of 'a' bits. The exponent of the final output is calculated as (again, assuming $\lceil log_2(k) \rceil + 2$ MSBs were added when converting to the second format)

$$e_k = e_{max} + \lceil log_2(k) \rceil + 1 - d$$

This is an example and it is not limited to a person skilled in the art that in other examples, different other known methods can be used to calculate the exponent $e_k$. The final output or the sum value obtained is thus represented with a normalized mantissa ($n_k$) and the exponent ($e_k$).

The architecture 300 of the adder can be used to add any number of floating point numbers. The example shown in FIG. 5 is a specific example of the adder 300 for adding a set of 4 floating point numbers. Further, additional number of elements can be added to each unit in the adder 500 in a similar manner, thereby expanding it to add any number of floating-point numbers (for example 20 floating-point numbers or 50 floating-point numbers) concurrently.

Figure 11:
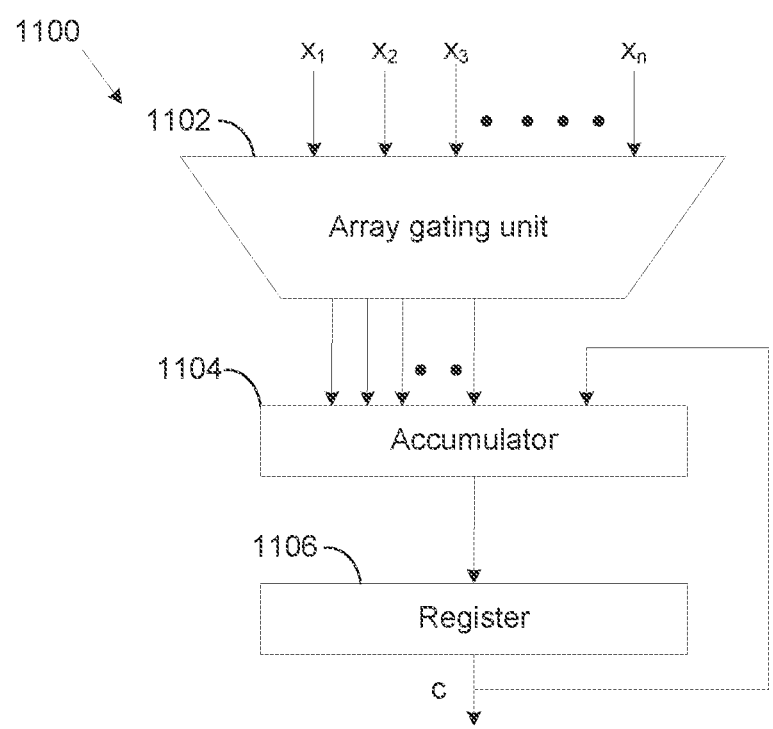
FIG. 11 illustrates the architecture 300 implemented as an accumulator.

Further the architecture 300 can also be used as an accumulator as shown in FIG. 11, for adding multiple batches of the set of floating-point numbers, even when there are more floating-point numbers than the input of the adder. FIG. 11 illustrates the architecture 300 implemented as an accumulator design. The accumulator design 1100 comprises an array gating unit 1102 receiving a large array of floating point numbers ($x_0$, $x_1$ ..., $x_n$), an accumulator 1104 which is an adder (300) as shown in FIG. 3 and a register 1106. Consider that the accumulator 1104 is an adder with an architecture 300 capable of adding a set of 33 floating-point numbers concurrently. If there is an array of 128 floating-point numbers ($x_0$, $x_1$ ..., $x_{127}$) to be added, then the accumulator 1104 adds the 128 floating-point numbers in the array in four separate batches in different clock cycles.

During a first cycle, the array gating unit 1102 provides first 32 floating-point numbers in the array to the accumulator 1104. The accumulator 1104 adds the first 32 floating-point numbers in the array ($x_0$, $x_1$ ..., $x_{31}$) with an accumulated value (c), where initially c=0, to generate a first output and store the first output as the accumulated value (c) in the register 1106. The first output is generated by performing addition in the same manner as described in FIG. 3 or FIG. 5. In a second cycle, the accumulator 1104 will add the next 32 floating-point numbers ($x_{32}$, $x_{33}$ ..., $x_{63}$) with the accumulated value (c) to generate a second output and pass the second output to be stored as the accumulated value. Similarly, the remaining numbers in the array are added in batches of 32 numbers with the updated accumulated value in every clock cycle. Thus, in a pipelined design, the addition of an array of 128 numbers will cost only three extra addition cycles.

Figure 7A:
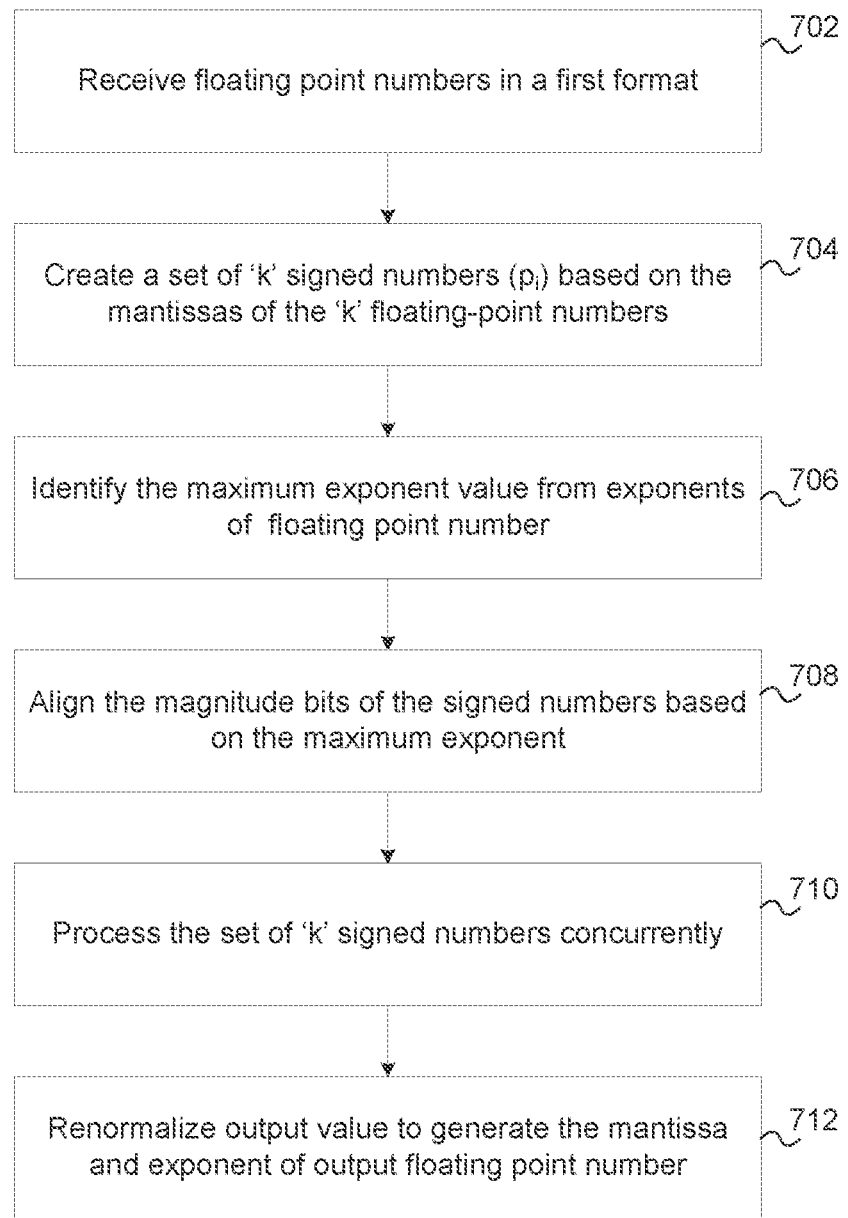
FIG. 7a is a flowchart illustrating a method of processing a set of k floating-point numbers.

FIG. 7a is a flowchart illustrating a method of processing a set of 'k' floating point numbers. The method includes performing addition and/or subtraction, using a hardware implementation of an architecture. Each floating-point number among the set of 'k' floating point numbers comprising a mantissa ($m_i$) and an exponent ($e_i$).

In step 702, the method includes receiving the set of 'k' floating point numbers in a first format. Each floating-point number in the first format comprising a mantissa ($m_i$) having a bit-length of 'b' bits and an exponent ($e_i$) having bit-length of 'a' bits. The bit-length 'b' bits of the mantissa ($m_i$) and the bit-length 'a' bits of the exponent ($e_i$) in the first format is identified based on the type of the floating-point number format. Further the floating-point numbers could be signed or unsigned number with an implicit or explicit leading bit. For example, a single precision (32 bit) floating point number in a first format, may typically be a signed number with an implicit leading bit that comprises a mantissa having a bit-length of 23 bits without including the leading bit, an exponent having bit length of 8 bits and an extra sign bit ($s_i$). In other examples a single precision (32 bit) floating point number in a first format may be a signed number with an explicit leading bit, and then the mantissa has a bit length of 23 bits including the explicit leading bit.

When the single precision (32 bit) floating point number in a first format is an unsigned number with an implicit leading bit there would not be any extra sign bit and the mantissa could be represented by a bit length of 24 bits (without including the leading bit). Further when the single precision (32 bit) floating point number in a first format is an unsigned number with an explicit leading bit, the bit length of 24 bits of mantissa includes an explicit leading bit.

On receiving the set of 'k' floating point numbers in the first format, at step 704, the method includes converting the mantissa ($m_i$) each of the set of 'k' floating-point numbers to a number ($y_i$). The numbers ($y_i$) are obtained by adding both extra MSBs and extra LSBs to the bit-length 'b' of the mantissas ($m_i$) in the first format. The bit length of b bits is extended based on the number 'k' (the number of floating-point numbers in the set). In an example with the set of 'k' floating point numbers in a first format as signed numbers adding extra MBS and LSBs comprises adding preferably $\lceil \log_2(k) \rceil + 2$ number of the most-significant bits and $\lceil \log_2(k-1) \rceil + 1$ number of least-significant bits. The number of extra MSBs and extra LSBs added to the bit-length b of the mantissa could be the same or different. The extra MSBs added include, in this example, a bit representing a sign bit and another bit representing a leading bit. Thus, the signed number is represented with a bit-length of 'n' bits including the sign bit $s_i$ and a leading bit (LB). The bit length 'n' is represented as $$n = b + \lceil \log_2(k) \rceil + \lceil \log_2(k-1) \rceil + x \text{ bits}$$

where x is an integer and preferably $x \geq 1$.

Further, the method at step 706 comprises identifying a maximum exponent ($e_{max}$) among the exponents ($e_i$) of the set of 'k' floating point numbers. The maximum exponent ($e_{max}$) is identified by a maximum exponent detection unit 304. The maximum exponent detection unit 304 implements an algorithm such as a maximum function for identifying a maximum value among a set of values (exponents, $e_i$). Step 706 could be performed before or after the step 704 or could be even performed in parallel to the step 706.

The method further comprises, at step 708, aligning the magnitude bits of the numbers '$y_i$' to be based on the maximum exponent ($e_{max}$). The number '$y_i$' is an integer represented as a fixed-point number having a bit length of n-bits. The method of aligning the magnitude bits of the numbers is discussed with respect to FIG. 7b. Aligning the magnitude bits of the numbers based on the maximum exponent is performed by an alignment unit 306. The alignment unit 306 thus generates an aligned number which is an integer $p_i$.

The method further comprises, at step 710, processing the set of 'k' aligned numbers $p_i$ concurrently to generate an output value q. The processing of the integers $p_1$ includes performing addition and/or subtraction of the k numbers. It is noted that addition of a negative number to a positive number is equivalent to performing a subtraction, and so the term processing is used herein to cover the acts of both addition and subtraction, alone or in combination. The processing of the k numbers is performed concurrently. That is the processing unit performs a process on all the integers in the set at the same time rather than, for example, processing elements of the set sequentially or processing the elements of the set in pairs. The processing unit 308 performs addition and/or subtraction of the k integers to generate an output value.

Further, at step 712, the method includes renormalizing and rounding the output value q to represent the output value as a floating-point number in a first format or any other format with a normalized mantissa $n_k$ and an exponent $e_k$. The method includes renormalizing the output value to represent the output value q as a standard normalized number. Further, the method performs rounding the normalized number $n_k$ to represent the number with a mantissa having a particular bit-length. In an example, the normalized number is rounded to a bit length of 'b' bits, in order to represent the number in the first format, as the received input, having a mantissa of bit length 'b'. In other examples, the output values are represented in a different floating-point number format compared to the inputs received. The normalizing is performed by initially counting the number of recurring '0' bits or '1' bits on the MSB side. The recurring '0' bits are counted when the output value 'q' is a non-negative (i.e. positive) number. The recurring '1' bits are counted when the output value 'q' is a negative number. Further, the normalizing is performed by shifting the bits of the output value q to the LSB side around the radix point to represent the signed number as a standard normalized number. Further, the method calculates an exponent value based on the maximum exponent and the counted number of recurring bits. The exponent value thus calculated is represented with a bit-length of 'a bits as explained above with reference to FIG. 5. Thus, the output 'q' is normalized to be represented as a floating-point number in the first format.

Figure 7B:
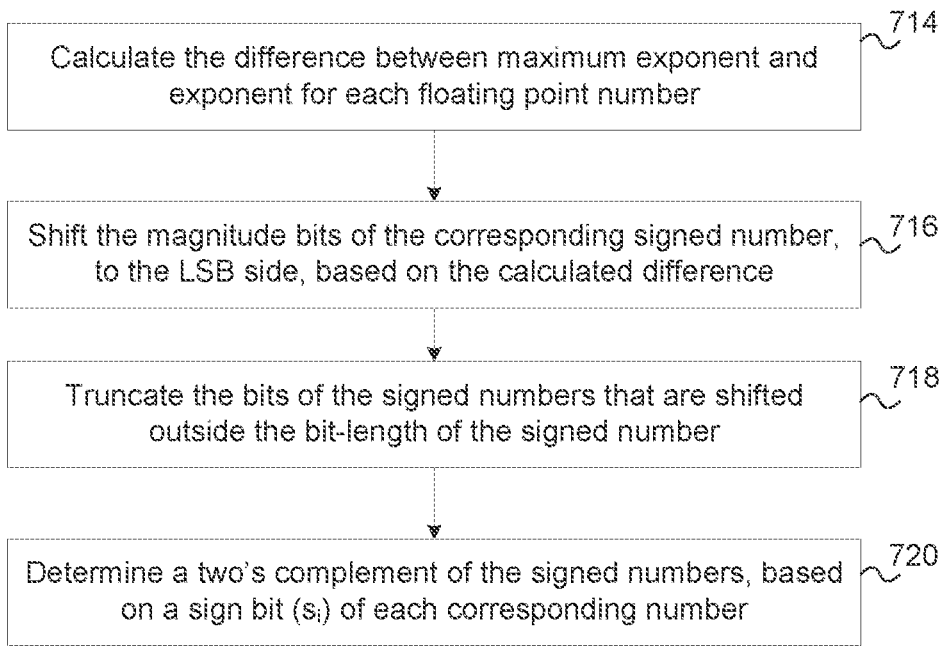
FIG. 7b is a flowchart illustrating a method of converting the mantissas of the set of floating-point number to a set of signed or unsigned numbers.

FIG. 7b is a flowchart illustrating a method of aligning the number ($y_i$) based on the maximum exponent.

The method includes, at a first step 714, calculating, for each floating-point number in the set of 'k' floating point numbers, the difference ($e_d$) between the maximum exponent ($e_{max}$) and exponent ($e_i$). The difference $e_d$ is calculated for each input floating point number by a subtractor unit in the alignment unit 306 The alignment unit 306 comprises a plurality of subtractor units for calculating the difference $e_d$.

The method includes at step 716 shifting the magnitude bits of the corresponding number, to the LSB side, based on the calculated difference of the corresponding floating point number. Aligning the magnitude bits by shifting position of the bits causes an underflow of the original 'b bits' from the mantissa of the number in the first format if the calculated difference $e_d$ is greater than the number of extra LSBs added while converting the mantissa $m_t$ in the first format to the number.

Further to shifting the magnitude bits of the number, the method at step 718 comprises truncating the bits of the numbers that are shifted outside the bit-length of the number. That is all the bits of the number that are shifted outside the bit-length 'n' are truncated. The method only truncates bits of the number corresponding to bits of the mantissa of the original first format number when the calculated difference is greater than the number of extra LSBs added. Any fair rounding scheme can be used for truncating the bits of the number. The error caused by the truncation of bits while processing the floating point numbers is insignificant as the mantissa ($m_t$) is already extended by adding number of extra LSBs to mitigate the effect of underflow while performing the steps of shifting or truncating the bits of the number.

The method at (an optional step 720) further comprises determining two's complement of the numbers, based on a sign bit ($s_i$) of each corresponding number. This step is optional if the received set of 'k' floating point numbers in a first format as signed numbers. A signed number is complemented when the sign bit (si) of the number indicates a negative number. The positive numbers are left unchanged and the all the numbers are then processed concurrently. Processing the 'k' numbers in an example includes calculating a sum value by performing an 'n' bit carry save addition. The sum value is further normalized and rounded to represent the output in a floating-point number format.

Figure 8:
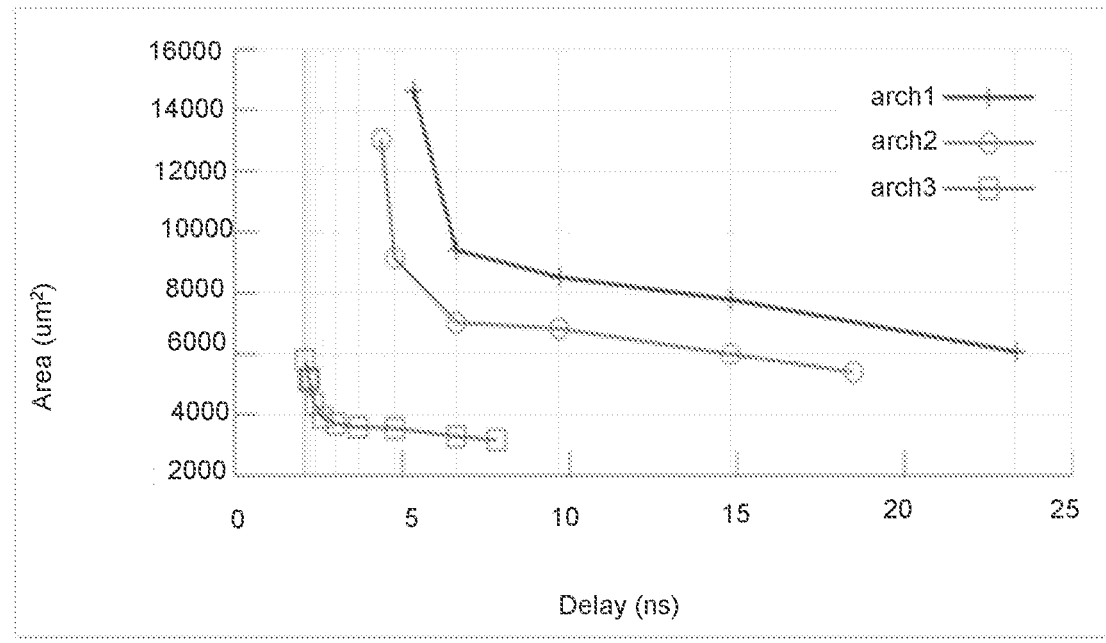
FIG. 8 is a graph illustrating area vs delay comparison for three different architectures of floating-point number adders.

FIG. 8 is a graph illustrating a comparison of the implementation of the architecture 300 with other standard architectures for processing a set of floating-point numbers. In the FIG. 8 a graphical representation of results of a first experiment comparing the implementation of the architecture 300 explained in FIG. 3 with other standard architectures is shown. The first experiment includes comparing area versus delay trade-offs of the different architectures. As shown in FIG. 8, in the first experiment, three architectures (arch 1, arch 2 and arch 3) are used for comparison. The arch 1 is an architecture of a balanced tree of floating-point adder implementation (with pairwise round to nearest and tie to even implementation). The results obtained for arch 1 are represented by cross (+) symbols on a first curve in FIG. 8. The arch 2 is another architecture of a balanced tree of floating-point adder implementation (with pairwise fair rounding implementation). The results obtained for arch 2 are represented by circle (o) symbols on a second curve shown in FIG. 8. The arch 3 is the implementation of the architecture 300 disclosed in this document (with fair rounding implementation). The results obtained for arch 3 are represented by square symbols on a third curve in FIG. 8. In the first experiment, the three architectures are implemented in software using VHDL.

In the first experiment, a set of floating-point numbers in a first format of single precision (32-bit) floating point number was used as input. Each floating-point number comprised a mantissa $m_t$ having bitlength of 23 bits (b=23 bits), exponent '$e_i$' having a bitlength 8 bits (a=8 bits) and a sign bit. The first experiment included synthesising the three architectures for various timing targets so as to observe area versus delay trade-offs. From the graph in FIG. 8 it is observed that the arch 3 (architecture 300) has the least delay and least area. In particular, the fastest circuit synthesized from architecture 300 uses less than 50% the area and has less than 50% the delay of the fastest circuits synthesized from the other architectures under consideration.

Further, the complexity of the hardware implementation of the different architectures are compared. The complexity of the hardware implementation such as the critical path is expressed using the Big O Notation. For the architecture 300, the maximum exponent detection unit 304 is implemented with $O(\log(k) \log(a))$ gates on the critical path. Further, the alignment unit 306 is implemented with $O(\log(b))$ gates on the critical path. The processing unit (308) i.e. the adder 508 is implemented with $O(\log(k)+\log(b))$ gates on the critical path. The normalizing unit 310 is implemented with $O(\log(a))$ gates on the critical path. Thus, the total hardware implementation could be implemented with $O(\log(k) \log(a)+\log(b))$ logic gates on its critical path. For increasing array size k and mantissa width b, the critical path is asymptotically shorter than architectures of a balanced tree of floating-point adders.

For the same input of the set of k floating point numbers in the first format, a straightforward implementation of a multiple-input adder consisting of a binary tree of floating-point adders (with a fixed rounding mode, for instance rounding towards zero) is explained below. By construction, the implementation produces a pairwise fairly rounded sum. The critical path in a balanced tree of floating-point adders goes through $O(\log(k))$ adders, each adder featuring $O(\log(ab))$ gates on its critical path. In total, architectures of a balanced tree of floating-point adders thus have $O(\log(k) \log(ab))$ logic gates on their critical path.

Further, the implementation of the architecture 300 generates output having a precision not worse than the worst case of the pairwise addition performed while using the architecture of binary tree adders or accumulator adder with fair rounding. A mathematical proof for the precision of the architecture 300 is provided later. It is shown that the accuracy of the result is not lower than the worst-case pairwise floating-point addition with a fair rounding scheme. This means that for any given input array, performing pairwise addition by iteratively replacing two terms in the array by their sum rounded to the nearest larger or smaller representable value can always yield a result less precise or equal to the result generated by addition using the architecture 300 disclosed. An imprecise choice of ordering the inputs and for performing the step of rounding, in known architectures, is to add numbers in increasing magnitude to the largest one and always round in the same direction. The precision of output obtained by the architecture 300 is not less precise than that the result obtained by making these choices.

The delay and area performance of the architecture 300 dramatically improves compared to a tree of floating-point adders by removing intermediate normalisation steps and replacing intermediate carry propagation steps with a single carry-save addition as shown in FIG. 8. The empirical precision of the architecture 300 as described above is shown to significantly outperform trees of floating-point adders as measured on Gaussian distributed inputs centred around zero.

Finally, the architecture 300 for addition is commutative. Any order of inputs yields the same output. This leads to better reproducibility of result, as the order in which floating point numbers in a set are bound to the inputs to the architecture 300 does not influence the result.

A mathematical proof for the precision of the architecture 300 is provided below. In the section below it is demonstrated that the precision of our algorithm is not less than the worst-case iterated pairwise addition with fair rounding.

Firstly, some basic property of fair rounding schemes are defined and proved. Let F1, F2⊆R∪{±∞} be two number formats and r∈R∪{±∞} be a number. We say that q is a fair rounding of r in format F, written q≈$_F$ r, when q is the least upper bound or the greatest lower bound of r in F.

We say that F1 is finer than F2 in the neighbourhood of r when the least upper bound and greatest lower bound of r in F2 belong to F1. The following proposition follows straightforwardly.

Proposition 1: If F1 is finer than F2 in the neighbourhood of r then for all values q1, q2 such that q1≈$_{F1}$ r and q2≈$_{F2}$ q1 we have q2≈$_{F2}$ r.

Now let F be a floating-point format with 'a' exponent bits, 'b' mantissa bits and an exponent bias 'c' used at the input and output of our computation. Further, a set of 'k' floating point numbers in format F as input. The algorithm proceeds by conversion to a fixed-point format G aligned on the largest exponent $e_{max}$ in the array.

Let l be an index such that $e_l=e_{max}$ is the maximum exponent. Numbers in format G are given as a signed integer p over b+⌈log(k)⌉+⌈log(k−1)⌉+3 bits, taking its value in the range $-2^{b+\lceil log(k)\rceil+\lceil log(k-1)\rceil+2}, \ldots, -2^{b+\lceil log(k)\rceil+\lceil log(k-1)\rceil+2}-1$ and representing the real number $2^{e_l-b-c-\lceil log(k-1)\rceil-1}p$. Each input floating point number $x_1$ is converted to a fixed point value $2^{e_l-b-c-\lceil log(k-1)\rceil-1}p_i \approx_G x_i$, where the choice of rounding is left to the implementation.

The fixed point values are then added together and their sum converted back to the original format hence producing the result $$y \approx_F 2^{e_l-b-c-\lceil log(k-1)\rceil-1} \sum_{i=0}^{k-1} p_i,$$

where the choice of rounding is again left to the implementation.

For the purpose of this analysis numbers in the input array are classified in two categories: small numbers, whose exponent is less than $e_l-\lceil log(k-1)\rceil-1$, and large numbers, whose exponent is between $e_l-\lceil log(k-1)\rceil-1$ and $e_l$. The input array is partitioned into an array of small numbers $x'_0, \ldots, x'_{k'-1}$ and an array of large numbers $x'_{k'}, \ldots, x'_{k-2}$, $x'_{k-1}=x_l$. The count k' of small numbers verifies 0≤k'≤k−1. For all i=0, ..., k−1, $n'_i$ and $e'_i$ denotes the significand and exponent of $x'_i$ respectively, and $p'_i$ the conversion of $x'_i$ to the fixed-point format G, such that $2^{e_l-b-c-\lceil log(k-1)\rceil-1} p'_i \approx_G x'_i$. Remark that while small numbers may incur a rounding error, large numbers are represented exactly.

A sequence $w_i$ is constructed by letting $w_0=2^{e_l-b-c-\lceil log(k-1)\rceil-1}p'_{k-1}$, $w_i=w_{i-1}+2^{e_l-b-c-\lceil log(k-1)\rceil-1}p'_{i-1}$ for i=0, ..., k−2, and $w_{k-1}=y$. Recall that $$y \approx_F 2^{e_l-b-c-\lceil log(k-1)\rceil-1} \sum_{i=0}^{k-1} p_i,$$

hence $w_{k-1} \approx_F w_{k-2}+2^{e_l-b-c-\lceil log(k-1)\rceil-1}p'_{k-2}$. Two lemmas regarding the magnitude of intermediate sums is proved in this decomposition. First, it is demonstrated that no underflow can happen in format G when adding small numbers to the one with largest exponent.

Lemma 1: If $x_l$ is normalised, then
$$|w_{i-1}+2^{e_l-b-c-\lceil log(k-1)\rceil-1}p'_{i-1}| \geq 2^{e_l-c-1}$$
for all i=1, ..., k'−1.

Proof: It is shown by induction that $|w_{i-1}+2^{e_l-b-c-\lceil log(k-1)\rceil-1}p'_{i-1}| \geq 2^{e_l-c}-i2^{e_l-c-\lceil log(k-1)\rceil-1}$ for all i=1, ..., k'−1. Let i be an integer between 1 and k'−1. Firstly, $|w_{i-1}+2^{e_l-b-c-\lceil log(k-1)\rceil-1}p'_{i-1}| \geq |w_{i-1}|-2^{e_l-b-c-\lceil log(k-1)\rceil-1}|p'_{i-1}|$ by triangular inequality. Then, as i≤k'−1 we have $|x'_{i-1}|<2^{e_l-c-\lceil log(k-1)\rceil-1}$ by hypothesis. Moreover, $\pm 2^{e_l-c-\lceil log(k-1)\rceil-1}$ are representable in G, hence after rounding we have $|2^{e_l-b-c-\lceil log(k-1)\rceil-1}p'_{k-1}| \leq \pm 2^{e_l-c-\lceil log(k-1)\rceil-1}$.

If i=1, then $w_0=2^{e_l-b-c-\lceil log(k-1)\rceil-1}p'_{k-1}=x_l$ as $x_l$ is representable in G, and in turn $|x_l| \geq 2^{e_l-c}$ as $x_l$ is normalised.

If i>1, then $w_{i-1}=2^{e_l-c}-(i-1)2^{e_l-c-\lceil log(k-1)\rceil-1}$ by induction hypothesis.

In either case, $|w_{i-1}+2^{e_l-b-c-\lceil log(k-1)\rceil-1}p'_{i-1}| \geq 2^{e_l-c-1}-i2^{e_l-c-\lceil log(k-1)\rceil-1}$ is obtained, which concludes the induction. As an immediate consequence we have $$|w_{i-1}+2^{e_l-b-c-\lceil log(k-1)\rceil-1}p'_{i-1}| \geq$$
$$2^{e_l-c-1}(2-i2^{-\lceil log(k-1)\rceil}) \geq 2^{e_l-c-1}\left(2-\frac{i}{k-1}\right),$$

so that $|w_{i-1}+2^{e_l-b-c-\lceil log(k-1)\rceil-1}p'_{i-1}| \geq 2^{e_l-c-1}$ for all i=1, ..., k'−1 as k' k−1.

Next, we show that no overflow can happen in format G when adding all other numbers to the one with largest exponent.

Lemma 2: If $x_l$ is normalised, then $|w_{i-1}+2^{e_l-b-c-\lceil log(k-1)\rceil-1}p'_{i-1}| \geq 2^{e_l-c+\lceil log(k)\rceil+1}-2^{e_l-b-c-\lceil log(k-1)\rceil-1}$ for all i=1, ..., k−1.

Proof: Remark that $|x_i| \leq 2^{e_l-c+1}-2^{e_l-c-b}$ for all i=0, ..., k−1 as $x_l$ is the largest input exponent, and in turn $2^{e_l-b-c-\lceil log(k-1)\rceil-1}|p'_i| \leq 2^{e_l-c+1}-2^{e_l-c-b}$ as the value±$(2^{e_l-c+1}-2^{e_l-c-b})$ is also representable in G. It follows that $|w_{i-1}+2^{e_l-b-c-\lceil log(k-1)\rceil-1}p'_{i-1}| \leq i(2^{e_l-c+1}-2^{e_l-c-b})$ for all i=1, ..., k−1 by straightforward induction on i. In turn $|w_{i-1}+2^{e_l-b-c-\lceil log(k-1)\rceil-1}p'_{i-1}| \leq k(2^{e_l-c+1}-2^{e_l-c-b}) \leq 2^{e_l-c+\lceil log(k)\rceil+1}-2^{e_l-b-c-\lceil log(k-1)\rceil-1}$.

The worst-case precision of architecture 300 is stated and proved in the following theorem.

Theorem 1: For any array $x_0, \ldots, x_{k-1}$ there exist a pairwise fairly rounded sum z of $x_0, \ldots, x_{k-1}$ such that applying to architecture 300 a set of inputs $x_0, \ldots, x_{k-1}$ yields an output y such that $$\left|y-\sum_{i=0}^{k-1} x_i\right| \leq \left|z-\sum_{i=0}^{k-1} x_i\right|.$$

Proof: Let us focus on the case where $x_l$ is normalised, other cases do not pose any difficulty. Consider the sequence $u_0, \ldots, u_{k-1}$ such that $u_0=x_l$ and $u_i$ is the greatest lower bound of $u_{i-1}+x'_{i-1}$ in F for all i=1, ..., k−1, and the sequence $v_0, \ldots, v_{k-1}$ such that $v_0=x_l$ and $v_i$ is the least upper bound of $v_{i-1}+x'_{i-1}$ in F for all i=1, ..., k−1. These sequences define the pairwise fairly rounded sums $u_{k-1}$ and $v_{k-1}$, obtained by systematically rounding intermediate sums in the same direction. It is clear that $$u_{k-1} \leq \sum_{i=0}^{k-1} x_i \leq v_{k-1}.$$

We claim that $u_i \leq w_i \leq v_i$ for all i=0, ..., k−1, so that $u_{k-1} \leq y \leq v_{k-1}$. This immediately gives us

$$\left| y - \sum_{i=0}^{k-1} x_i \right| \leq \left| z - \sum_{i=0}^{k-1} x_i \right|$$

for at least one of $z = u_{k-1}$ or $z = v_{k-1}$.

We now show by induction that $u_i \leq w_i \leq v_i$ for all i=0, ..., k−1.

i=0: we have $u_0 = v_0 = x_l$ by definition and $w_0 = x_l$ as $w_0 \approx_G x_l$ and $x_l$ is representable in G.

i=1, ..., k'−1: by induction hypothesis we have $u_{i-1} \leq w_{i-1} \leq v_{i-1}$, and in turn $u_{i-1} + x'_{i-1} \leq w_{i-1} + x'_{i-1} \leq v_{i-1} + x'_{i-1}$. Moreover by Lemmas 1 and 2 we have $2^{e_f - c + 1} \leq |w_i| \leq 2^{e_f - c + \lceil \log(k) \rceil + 1} - 2^{e_f - b - c - \lceil \log(k-1) \rceil - 1}$ so that G is finer than F in the neighbourhood of $w_{i-1} + x'_{i-1}$ as for this exponent range G accommodates at least the same number of mantissa bits as F. Since G is a fixed-point format and the sum does not overflow or underflow we also have that rounding $x'_i$ and then adding the result to $w_{i-1}$ is equivalent to adding $x'_{i-1}$ to $w_{i-1}$ and then rounding the result. We have that $u_i$ is the greatest lower bound of $u_{i-1} + x'_{i-1}$ in F, and less or equal to the greatest lower bound of $u_{i-1} + x'_{i-1}$ in G. Similarly $v_i$ is the least upper bound of $u_{i-1} + x'_{i-1}$ in F, and greater or equal to the least upper bound of $u_{i-1} + x'_{i-1}$ in G. Hence by definition of a fair rounding we have $u_i \leq w_i \leq v_i$.

i=k', k'+1, ..., k−2: by induction hypothesis we have $u_{i-1} \leq w_{i-1} \leq v_{i-1}$, and in turn $u_{i-1} + x'_{i-1} \leq w_{i-1} + x'_{i-1} \leq v_{i-1} + x'_{i-1}$. Since $x_{i'}$ is a large number, it is representable in G and following Lemma 2 we have $w_i = w_{i-1} + x'_{i-1}$. As $u_i \leq u_{i-1} + x'_{i-1}$ and $v_i \geq v_{i-1} + x'_{i-1}$ we obtain $u_i \leq w_i \leq v_i$.

i=k−1: It follows from the induction hypothesis that $u_{k-2} + x'_{k-2} \leq w_{k-2} + x'_{k-2} \leq v_{k-2} + x'_{k-2}$. Using a similar argument as previously we have either $w_{k-2} + x'_i = w_{k-2} + 2^{e_f - b - c - \lceil \log(k-1) \rceil - 1} p'_{k-2}$ or G is finer that F in the neighbourhood of $w_{k-2} + x'_{k-2}$ and $w_{k-2} + x'_{k-2} \approx_G w_{k-2} + 2^{e_f - b - c - \lceil \log(k-1) \rceil - 1} p'_{k-2}$. Then from Proposition 1 we obtain $w_{k-1} \approx_F w_{k-2} + x'_{k-2}$ and in turn $u_{k-1} \leq w_{k-1} \leq v_{k-1}$ by definition of a fair rounding.

A similar reasoning applies for denormal values of $x_l$. In that case all intermediate sums are representable in G, so that only the final rounding incurs a loss of precision. As previously this final rounding preserves the ordering. Infinite or NaN input values of $x_l$ result in an infinite or NaN output value, which does not involve rounding.

Figure 9:
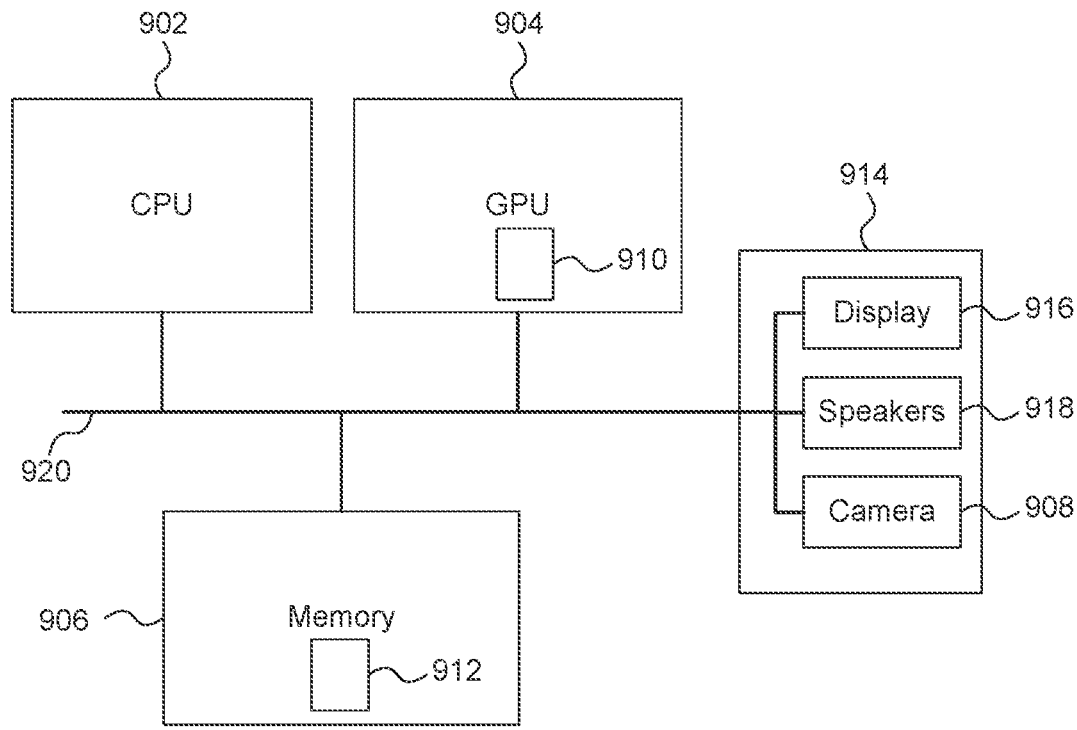
FIG. 9 shows a computer system in which an adder is implemented.

FIG. 9 shows a computer system in which the graphics processing systems described herein may be implemented. The computer system comprises a CPU 902, a GPU 904, a memory 906 and other devices 914, such as a display 916, speakers 918 and a camera 908. A processing block 910 (corresponding to processing blocks 110) is implemented on the GPU 904. In other examples, the processing block 910 may be implemented on the CPU 902. The components of the computer system can communicate with each other via a communications bus 920. A store 912 (corresponding to store 112) is implemented as part of the memory 906.

While FIG. 9 illustrates the implementation of a graphics processing system, it will be understood that a similar block diagram could be drawn for an artificial intelligence accelerator system—for example, by replacing the GPU 904 with a Neural Network Accelerator (NNA), or adding the NNA as an additional unit. In such cases, the architecture 300 of the adder can be implemented in the NNA.

The adder described herein may be embodied in hardware on an integrated circuit. Generally, any of the functions, methods, techniques, or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block, or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language, or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset (which may also be referred to as a hardware design) that when processed (i.e. run) in an integrated circuit manufacturing system configures the system to manufacture a computing device comprising any apparatus described herein. An integrated circuit definition dataset may be, for example, an integrated circuit description.

Therefore, there may be provided a method of manufacturing, at an integrated circuit manufacturing system, an architecture of adder as described herein. Furthermore, there may be provided an integrated circuit definition dataset that, when processed in an integrated circuit manufacturing system, causes the method of manufacturing an adder to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset (e.g. a hardware design) at an integrated circuit manufacturing system so as to configure the system to manufacture an adder will now be described with respect to FIG. 10.

Figure 10:
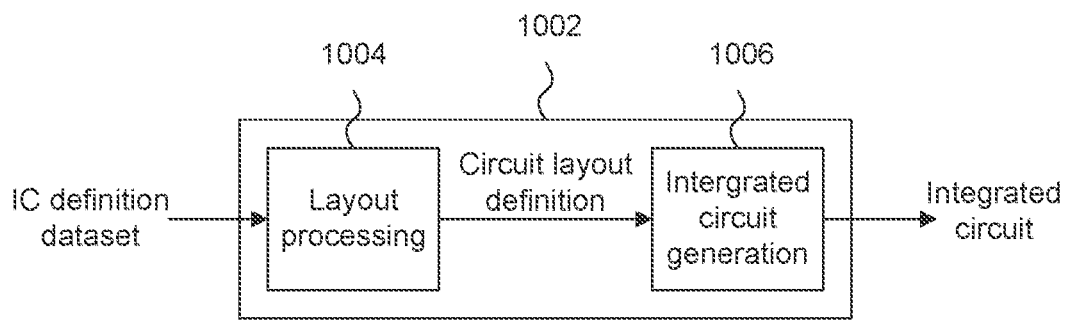
FIG. 10 shows an integrated circuit manufacturing system for generating an integrated circuit embodying an adder.

FIG. 10 shows an example of an integrated circuit (IC) manufacturing system 1002 which is configured to manufacture an adder as described in any of the examples herein. In particular, the IC manufacturing system 1002 comprises a layout processing system 1004 and an integrated circuit generation system 1006. The IC manufacturing system 1002 is configured to receive an IC definition dataset/hardware design (e.g. defining an adder as described in any of the examples herein), process the IC definition dataset, and generate an IC according to the IC definition dataset (e.g. which embodies an adder as described in any of the examples herein). The processing of the IC definition dataset configures the IC manufacturing system 1002 to manufacture an integrated circuit embodying an adder as described in any of the examples herein.

The layout processing system 1004 is configured to receive and process the IC definition dataset/hardware design to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an adder without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset/hardware design, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset/hardware design to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing a set of 'k' floating-point numbers to perform addition and/or subtraction, $k \geq 3$, using a hardware logic implementation, each floating-point number comprising a mantissa ($m_i$) and an exponent ($e_i$), wherein the method comprises:
   receiving, by a format conversion circuit in the hardware logic implementation, the set of 'k' floating-point numbers in a first format, each floating-point number in the first format comprising a mantissa ($m_i$) with a bit-length of 'b' bits;
   creating, by the format conversion circuit in the hardware logic implementation, a set of 'k' numbers ($y_i$) based on the mantissas of the 'k' floating-point numbers, the numbers ($y_i$) having a bit-length of 'n' bits obtained by adding both extra most-significant bits and extra least-significant bits to the bit-length 'b' of the mantissa ($m_i$), wherein the 'n' bits comprises a number of magnitude bits, wherein 'n' is $b+\lceil\log_2(k)\rceil+\lceil\log_2(k-1)\rceil+x$ bits, where x is an integer, and $x \geq 1$ and $x \leq 3$, wherein adding the extra most-significant bits comprises adding at least $\lceil\log_2(k)\rceil$ number of most-significant bits;
   identifying, by a maximum exponent detection circuit in the hardware logic implementation, a maximum exponent ($e_{max}$) among the exponents $e_i$;
   aligning, by an alignment circuit in the hardware logic implementation, the magnitude bits of the numbers ($y_i$) based on the maximum exponent ($e_{max}$); and
   processing, by a processing circuit in the hardware logic implementation, the set of 'k' numbers ($y_i$) concurrently;
   wherein processing of the set of 'k' numbers ($y_i$) by the processing circuit involves performing a computation that is required to perform a data processing function.

2. The method as claimed in claim 1, wherein the set of 'k' floating-point numbers comprises:
   unsigned floating-point numbers that implicitly includes a leading bit and $x \geq 2$; or
   signed floating-point numbers that implicitly includes a leading bit and $x=3$.

3. The method as claimed in claim 1, wherein the set of 'k' floating-point numbers comprises:
   unsigned floating-point numbers that explicitly includes a leading bit and $x \geq 1$; or
   signed floating-point numbers that explicitly includes a leading bit and $x \geq 2$.

4. The method as claimed in claim 1, wherein $x \leq b$.

5. The method as claimed in claim 1, wherein adding the extra least-significant bits comprises adding at least $\lceil\log_2(k-1)\rceil+1$ number of least-significant bits.

6. The method as claimed in claim 2, wherein adding the extra most-significant bits comprises adding a leading bit if the received set of 'k' floating-point numbers in the first format implicitly include a leading bit, optionally wherein the method comprises forming the magnitude bits of the numbers ($y_i$) by prefixing the bits of the mantissa ($m_i$) of the floating-point number with the leading bit.

7. The method as claimed in claim 1, wherein the method further comprises:
   calculating an output value by processing 'k' numbers ($y_i$);
   renormalizing the output value; and
   rounding the output value to represent the output value as a floating-point number.

8. The method as claimed in claim 1, wherein aligning the magnitude bits of the numbers ($y_i$) to be based on the maximum exponent ($e_{max}$) comprises the steps of, for each floating-point number (i):
   calculating the difference ($e_d$) between the maximum exponent ($e_{max}$) and exponent ($e_i$); and
   shifting the magnitude bits of the corresponding number ($y_i$), to the LSB side, based on the calculated difference ($e_d$).

9. The method as claimed in claim 8, wherein:
   further to shifting the magnitude bits of the numbers ($y_i$), the method further comprises truncating the bits of the numbers ($y_i$) that are shifted outside the bit-length of the number; and/or
   the method further comprises determining a two's complement of the magnitude bits of the numbers ($y_i$), based on a sign bit ($s_i$) of each corresponding floating-point number (i), if the set of 'k' floating-point numbers comprises signed floating-point numbers.

10. A hardware logic implementation for processing a set of k floating-point numbers to perform addition and/or subtraction, $k \geq 3$, each floating-point number comprising, a mantissa ($m_i$) and, an exponent ($e_i$), the hardware logic implementation comprising:
    a format conversion circuit configured to:
      receive the set of 'k' floating-point numbers in a first format, each floating-point number in the first format comprises the mantissa ($m_i$) with a bit-length of 'b' bits; and
      convert the mantissa ($m_i$) of the set of 'k' floating-point numbers to a set of 'k' numbers ($y_i$), the numbers ($y_i$) having a bit-length of 'n' bits created by adding both extra most-significant bits and extra least-significant bits to the bit-length 'b' of the mantissa ($m_i$), where in the 'n' bits comprises a number of magnitude bits and wherein 'n' is $b+\lceil\log_2(k)\rceil+\lceil\log_2(k-1)\rceil+x$ bits, where x is an integer, and $x \geq 1$ and $x \leq 3$, wherein adding the extra most-significant bits comprises adding at least $\lceil\log_2(k)\rceil$ number of the most-significant bits;
    a maximum exponent detection circuit configured to identify a maximum exponent ($e_{max}$) among the exponents $e_i$;
    an alignment circuit configured to align the magnitude bits of the numbers ($y_i$) based on the maximum exponent ($e_{max}$); and
    a processing circuit configured to process the set of 'k' numbers ($y_i$) concurrently to generate an output value;
    wherein processing of the set of 'k' numbers ($y_i$) by the processing circuit involves performing a computation that is required to perform a data processing function.

11. The hardware logic implementation as claimed in claim 10, wherein the format conversion circuit receives the set of 'k' floating-point numbers in a first format comprising:

unsigned floating-point numbers which explicitly includes a leading bit and x≥1; or unsigned floating-point numbers which implicitly includes a leading bit and x≥2.

12. The hardware logic implementation as claimed in claim 10, wherein the format conversion circuit receives the set of 'k' floating-point numbers in a first format comprising:

signed floating-point numbers which explicitly includes a leading bit and x≥2; or signed floating-point numbers which implicitly includes a leading bit and x=3.

13. The hardware logic implementation as claimed in claim 10, further comprises a renormalizing circuit configured to:

renormalize the output value; and round the output value to represent the output value as a floating-point number.

14. The hardware logic implementation as claimed in claim 10, wherein the format conversion circuit converts the mantissa ($m_i$) by adding a leading bit, if the received set of 'k' floating-point numbers in the first format implicitly include a leading bit.

15. The hardware logic implementation as claimed in claim 14, wherein the format conversion circuit prefixes each mantissa ($m_i$) with the added leading bit while creating the numbers ($y_i$).

16. The hardware logic implementation as claimed in claim 10, wherein the alignment circuit aligns the magnitude bits of the numbers ($y_i$) to be based on the maximum exponent ($e_{max}$), wherein the alignment circuit comprises:

a plurality of subtraction circuits, wherein each subtraction circuit is configured to calculate the difference ($e_d$) between the maximum exponent ($e_{max}$) and exponent ($e_i$) for each floating-point number (i); and a plurality of shifter circuits, each shifter circuit configured to shift the magnitude bits of the corresponding number ($y_i$), to the LSB side, based on the calculated difference ($e_d$).

17. The hardware logic implementation as claimed in claim 16, wherein the alignment circuit further truncates the bits of the numbers ($y_i$) that are shifted outside of the bit-length of the numbers ($y_i$).

18. The hardware logic implementation as claimed in claim 16, wherein the alignment circuit further comprises a plurality of complementing circuits configured to determine two's complement of the magnitude bits of each number, based on a sign bit ($s_i$) of the corresponding floating-point number (i), if the set of 'k' floating-point numbers comprises signed floating-point numbers.

19. A non-transitory computer readable storage medium having stored thereon computer readable code configured to cause the method of claim 1 to be performed when the computer readable code is run on at least one processor.

* * * * *